(12) United States Patent
Hida

(10) Patent No.: US 11,511,684 B2
(45) Date of Patent: Nov. 29, 2022

(54) ARTICLE FIXATION APPARATUS AND ARTICLE FIXATION STRUCTURE ASSEMBLY METHOD

(71) Applicant: HONDA MOTOR CO., LTD., Tokyo (JP)

(72) Inventor: Kazunori Hida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 350 days.

(21) Appl. No.: 16/681,856

(22) Filed: Nov. 13, 2019

(65) Prior Publication Data

US 2020/0189492 A1    Jun. 18, 2020

(30) Foreign Application Priority Data

Dec. 12, 2018  (JP) .............................. JP2018-232871

(51) Int. Cl.
*B60R 9/04* (2006.01)
*B60R 13/06* (2006.01)

(52) U.S. Cl.
CPC ................ *B60R 13/06* (2013.01); *B60R 9/04* (2013.01)

(58) Field of Classification Search
CPC .. B60R 9/04; B60R 9/08; B60R 9/055; B60D 25/06; B60D 25/07
See application file for complete search history.

(56) References Cited

U.S. PATENT DOCUMENTS

| 9,187,045 | B2 | 11/2015 | Bittner | |
|---|---|---|---|---|
| 2009/0020573 | A1* | 1/2009 | Binder | B60R 9/04 224/326 |
| 2015/0137563 | A1* | 5/2015 | Eberle | B60R 9/04 296/210 |

FOREIGN PATENT DOCUMENTS

| CN | 108058650 | | 5/2018 | |
|---|---|---|---|---|
| CN | 207773024 | | 8/2018 | |
| CN | 207773024 U | * | 8/2018 | |
| DE | 20316215 U1 | * | 1/2004 | ............... B60R 9/04 |
| DE | 102012006822 A1 | * | 10/2013 | ............... B60R 9/04 |
| EP | 2532568 A2 | * | 12/2012 | ............... B60R 9/04 |
| JP | 02-003944 | | 1/1990 | |
| JP | 03-072050 | | 7/1991 | |
| JP | 04-119248 | | 10/1992 | |
| JP | 05-001605 | | 1/1993 | |
| JP | 09-207681 | | 8/1997 | |

OTHER PUBLICATIONS

Japanese Office Action for Japanese Patent Application No. 2018-232871 dated Aug. 25, 2020.

* cited by examiner

*Primary Examiner* — Scott T McNurlen
(74) *Attorney, Agent, or Firm* — Amin, Turocy & Watson, LLP

(57) ABSTRACT

An article fixation apparatus includes an article attachment member and a first seal material. The article attachment member includes a protrusion part which protrudes toward a vehicle outside via a penetration hole of a roof panel from a vehicle inside of the roof panel and which fixes an article and a head part seat surface that is joined to a lower surface side of a reinforcement member. The first seal material prevents water permeation to the vehicle inside of the roof panel from a gap between the penetration hole and the protrusion part.

6 Claims, 12 Drawing Sheets

FIG. 5
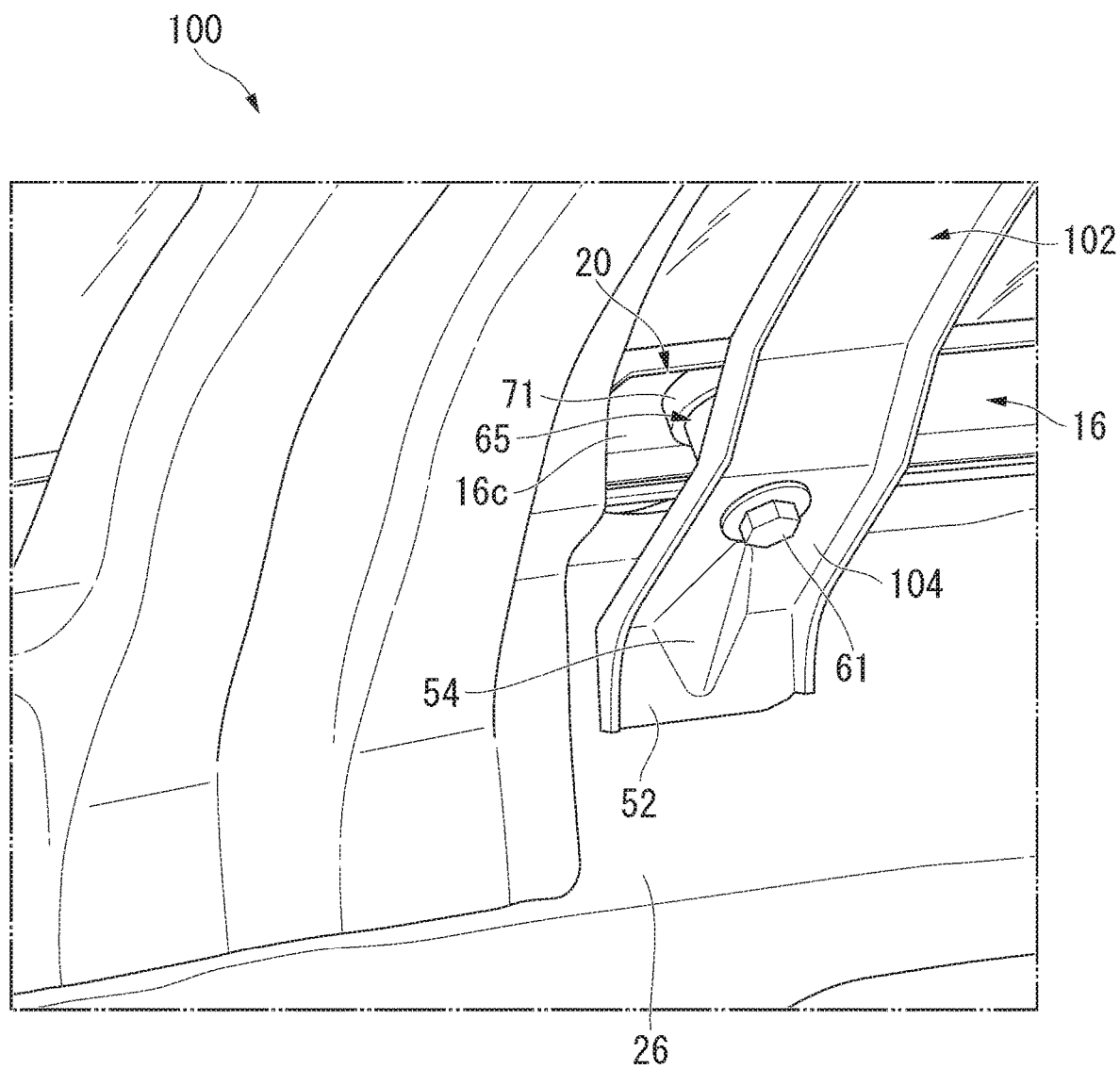
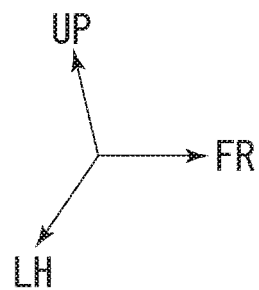

ARTICLE FIXATION APPARATUS AND ARTICLE FIXATION STRUCTURE ASSEMBLY METHOD

CROSS-REFERENCE TO RELATED APPLICATION

Priority is claimed on Japanese Patent Application No. 2018-232871, filed on Dec. 12, 2018, the contents of which are incorporated herein by reference.

BACKGROUND

Field of the Invention

The present invention relates to an article fixation apparatus and an article fixation structure assembly method.

Background

As an article fixation apparatus, for example, an apparatus is known which fixes a roof rail to a roof panel of a vehicle body via an adjustment mechanism. Specifically, in the article fixation apparatus, a support member attached to the vehicle body is arranged below the roof panel, and the adjustment mechanism is interposed between the support member and the roof panel. An upper end part of the adjustment mechanism is exposed upward from an opening part of the roof panel, and a fastening bolt that penetrates through the support member and the adjustment mechanism from below protrudes above the roof panel and is screwed to a nut. The nut is attached to the roof rail.

Thereby, the roof rail is attached to the roof panel with the fastening bolt and is fixed in a state where the adjustment mechanism is interposed between the support member and the roof panel (for example, refer to U.S. Pat. No. 9,187,045).

SUMMARY

However, in the article fixation apparatus of U.S. Pat. No. 9,187,045, the fastening bolt that penetrates through the adjustment mechanism from below protrudes above the roof panel and is screwed to the nut. That is, the fastening bolt and the nut are arranged above the roof panel. Therefore, it is conceivable that water which enters an inner part of the roof rail enters the inside of the roof panel via a gap between the fastening bolt and the nut.

In order to prevent such a problem, for example, it is conceivable to close a gap between the roof rail and the roof panel using a seal material or the like. However, the roof panel is a thin plate and is therefore easily deformed. The roof rail is an elongated member that extends in a vehicle body front-to-rear direction, and a seal structure that closes the gap becomes complicated. From these viewpoints, there remains room for improvement.

An aspect of the present invention aims to provide an article fixation apparatus and an article fixation structure assembly method capable of obtaining a seal effect that can prevent water permeation to an inside of a roof panel with a simple configuration.

(1) An article fixation apparatus according to an aspect of the present invention is an article fixation apparatus that is configured to fix an article to a roof panel, the apparatus including: an article attachment member that includes a protrusion part which protrudes toward a vehicle outside via a penetration hole of the roof panel from a vehicle inside of the roof panel and a head part seat surface that is joined to a lower surface side of the roof panel; and a first seal material that prevents water permeation to the vehicle inside of the roof panel from a gap between the penetration hole and the protrusion part, wherein the article is fixed to the roof panel by the article being attached to the protrusion part of the article fixation member.

In this way, the first seal material is provided in the gap between the penetration hole and the protrusion part so as to prevent permeation of water through the gap. Thereby, it is possible to obtain a seal effect capable of preventing water permeation to the vehicle inside from the roof panel with a simple configuration.

Further, the protrusion part of the article attachment member protrudes outward from the roof panel. Therefore, when an article such as the roof rail or a spoiler is attached to the protrusion part, the protrusion part can be also used as a positioning reference of the article, and it is possible to enhance the attachment workability of the article.

(2) In the above article fixation apparatus, the head part seat surface of the protrusion part may be joined throughout to an entire circumference of the penetration hole at the lower surface side of the roof panel.

In this way, the head part seat surface of the article attachment member is joined throughout to the entire circumference of the penetration hole at the lower surface side of the roof panel. Accordingly, it is possible to obtain a seal effect throughout the entire circumference on the outside of the gap between the penetration hole and the protrusion part with a simple configuration in which the head part seat surface is joined to the lower surface side of the roof panel. Thereby, it is possible to further enhance a reliable seal effect with a simple seal configuration. The "join" includes annular projection welding, spot welding, an annular seal material, and the like.

(3) In the above article fixation apparatus, the lower surface side of the roof panel may include a lower surface of the roof panel and a lower surface of a reinforcement member that is joined to the lower surface of the roof panel, and the reinforcement member may be joined to a region of the lower surface of the roof panel, the region being arranged around the penetration hole and being covered by the article from a vehicle body upward direction.

In this way, the reinforcement member is joined to the lower surface of the roof panel around the penetration hole. Accordingly, it is possible to reinforce the roof panel around the penetration hole to which a relatively large load is input from the protrusion part by the reinforcement member. Thereby, it becomes possible to decrease a plate thickness size of the entire roof panel, and it is possible to reduce the weight of the roof panel (that is, the vehicle body).

Further, the reinforcement member is joined to the region, which is covered by the article from the vehicle body upward direction, of the lower surface of the roof panel. Thereby, a joint part (for example, a welding trace when joining by spot welding or the like) at which the reinforcement member is joined to the roof panel can be covered from the vehicle body upward direction by the article, and it is possible to ensure an appearance property (visual quality).

(4) The above article fixation apparatus may include a second seal material that is provided between the reinforcement member and the lower surface of the roof panel throughout an entire circumference of the penetration hole.

In this way, it is possible to obtain a seal effect by the second material at the gap between the reinforcement member and the lower surface of the roof panel throughout the entire circumference of the penetration hole. Thereby, it is possible to further enhance a reliable seal effect with a simple seal configuration.

(5) In the above article fixation apparatus, the article attachment member may include an adjustment mechanism, and the adjustment mechanism may include one member on which the protrusion part and the head part seat surface are integrally provided and another member that is capable of being screwed to the one member and that is fixed to a support member on a vehicle body side.

In this way, the article attachment member includes the adjustment mechanism, the one member is joined to the roof panel, and the other member is fixed to the vehicle body side. Accordingly, by the adjustment of a screw state of the adjustment mechanism, it is possible to absorb, for example, a position displacement in a vertical direction of the roof panel when the roof panel is joined by brazing to a roof side rail or a position displacement in the vertical direction of the support member when the support member is fixed to the vehicle body side.

(6) The above article fixation apparatus may further include a fastening bolt which is configured to fasten the support member to the other member, and the support member may have an attachment hole through which the fastening bolt that is fastened to the other member is capable of penetrating and which allows a position adjustment in a direction that intersects an axial direction of the fastening bolt.

For example, it is conceivable that the support member and the roof panel are displaced in a direction that intersects an axis line direction of the fastening bolt. Therefore, the attachment hole of the support member is formed to allow the position adjustment of the fastening bolt. Thereby, by adjusting the position of the fastening bolt in accordance with the displacement between the support member and the roof panel, it is possible to absorb the displacement between the support member and the roof panel by the attachment hole.

(7) In the above article fixation apparatus, a base end part of the support member may be supported by an attachment part on the vehicle body side, and the support member may have a brace that is provided on the base end part and that extends at least in a vehicle width inward direction.

In this way, by providing the brace on the support member, it is possible to reinforce the support member by the brace, particularly in a case where the support member is supported in a cantilever manner by the attachment part on the vehicle body side. Accordingly, when a load input from the article is transmitted to the support member via the adjustment mechanism, it is possible to appropriately support the transmitted load by the support member. Thereby, the load transmitted to the support member can be satisfactorily transmitted to the vehicle body via the support member and the attachment part on the vehicle body side.

(8) In the above article fixation apparatus, the support member may be a cross member provided so as to connect a left frame and a right frame.

In this way, by using the support member as the cross member, both ends of the cross member can be supported by the left frame and the right frame. Thereby, it is possible to enhance the rigidity of the support member, and the load input from the article can be appropriately supported by the support member. In particular, in a case where the article is a roof rack, a relatively large load due to luggage on the roof rack can be appropriately supported by the support member.

Further, by providing the support member on the left frame and the right frame, for example, an impact load caused by a side impact input from the left frame or the right frame side can be appropriately supported by the support member.

(9) In the above article fixation apparatus, the article attachment member may include a fixation part at which the head part seat surface is joined to the reinforcement member and an adjustment mechanism that is offset in a vehicle body front-to-rear direction with respect to the fixation part, and the adjustment mechanism may include one member that is fixed to the reinforcement member and another member that is capable of being screwed to the one member and that is fixed to a support member on a vehicle body side.

In this way, by offsetting the fixation part and the adjustment mechanism in the vehicle body front-to-rear direction, each of the fixation part and the adjustment mechanism can be arranged at an appropriate position. For example, the fixation part can be arranged at a position (for example, the middle of an article) at which it is possible to appropriately support an article, and the adjustment mechanism can be arranged in the vicinity of a center pillar (that is, a skeleton member of a vehicle body).

Accordingly, a load that is transmitted to the fixation part can be dispersed to the reinforcement member, and further, a load that is transmitted to the adjustment mechanism from the fixation part can be appropriately transmitted to the center pillar (that is, the vehicle body). Thereby, the load that is input from the article can be favorably supported by the vehicle body.

(10) In the above article fixation apparatus, the article attachment member may include an adjustment mechanism, the adjustment mechanism may include one member on which the protrusion part and the head part seat surface are integrally provided and another member that is capable of being screwed to the one member and that is fixed to a support member on a vehicle body side, the reinforcement member may include a front slope part that extends with a downward slope in a vehicle body rearward direction, a rear slope part that is provided to be spaced in the vehicle body rearward direction from the front slope part and that extends with an upward slope in the vehicle body rearward direction, and a middle attachment part which is provided between the rear slope part and the front slope part and to which the one member is fixed, and the middle attachment part may be arranged in parallel to a support attachment part to which the other member is fixed in the support member.

In this way, the middle attachment part of the reinforcement member is arranged in parallel to the support attachment part of the support member. Further, the one member is fixed to the middle attachment part, and the other member is fixed to the support attachment part. Therefore, for example, in a situation where the roof panel is formed in a curved surface that protrudes in a vehicle body outward direction, it is not necessary for the adjustment mechanism to include a configuration that corresponds to the curved surface of the roof panel, and it is possible to simply the adjustment mechanism.

Further, the reinforcement member includes the front slope part and the rear slope part, and thereby, the rigidity of the reinforcement member can be enhanced by the front slope part and the rear slope part. Thereby, the load of the article can be appropriately transmitted via the fixation part to the middle attachment part.

(11) In the above article fixation apparatus, the reinforcement member may include a reinforcement slope part that is sloped with a downward slope toward an outside part of the roof panel from a reinforcement attachment part that is joined to the roof panel, and a closed cross-section may be formed of the reinforcement slope part and the roof panel.

In this way, the closed cross-section is formed of the reinforcement slope part and the roof panel, and thereby, it is possible to enhance the strength and rigidity of a joint region that is joined to the roof panel in the reinforcement member and enhance the position accuracy of the joint region. Thereby, it becomes possible to support the load of the article by the joint region, and the adjustment mechanism can be made unnecessary.

(12) An article fixation structure assembly method according to another aspect of the present invention is an assembly method for assembling the above article fixation apparatus, the method including: a first step in which, in a state where the protrusion part protrudes from a reinforcement member that is joined to a lower surface of the roof panel, the head part seat surface together with the adjustment mechanism is fixed to a lower surface of the reinforcement member; a second step in which, in a state where the protrusion part protrudes from the roof panel, the reinforcement member is fixed to the roof panel; and a third step in which the adjustment mechanism is fixed to the support member.

In this way, after the head part seat surface together with the adjustment mechanism is fixed to the lower surface of the reinforcement member in the first step, the reinforcement member is fixed to the roof panel in the second step. Further, the adjustment mechanism is fixed to the support member in the third step. Thereby, in a state where the protrusion part protrudes from the roof panel, it is possible to easily assemble the adjustment mechanism to be interposed between the reinforcement member and the support member.

Further, by providing the first seal material in the gap between the penetration hole and the protrusion part, it is possible to prevent permeation of water through the gap. Thereby, it is possible to obtain a seal effect capable of preventing water permeation to the vehicle inside from the roof panel with a simple configuration.

The article fixation apparatus and the article fixation structure assembly method according to the aspect of the present invention provides the first seal material in a gap between the penetration hole and the protrusion part and prevents permeation of water through the gap.

Thereby, it is possible to obtain a seal effect capable of preventing water permeation to the inside of the roof panel with a simple configuration.

BRIEF DESCRIPTION OF THE DRAWINGS

FIG. 5 is a perspective view of a vehicle body upper part structure that includes an article fixation apparatus according to a second embodiment when seen from the vehicle room side.

DESCRIPTION OF EMBODIMENTS

Figure 1:
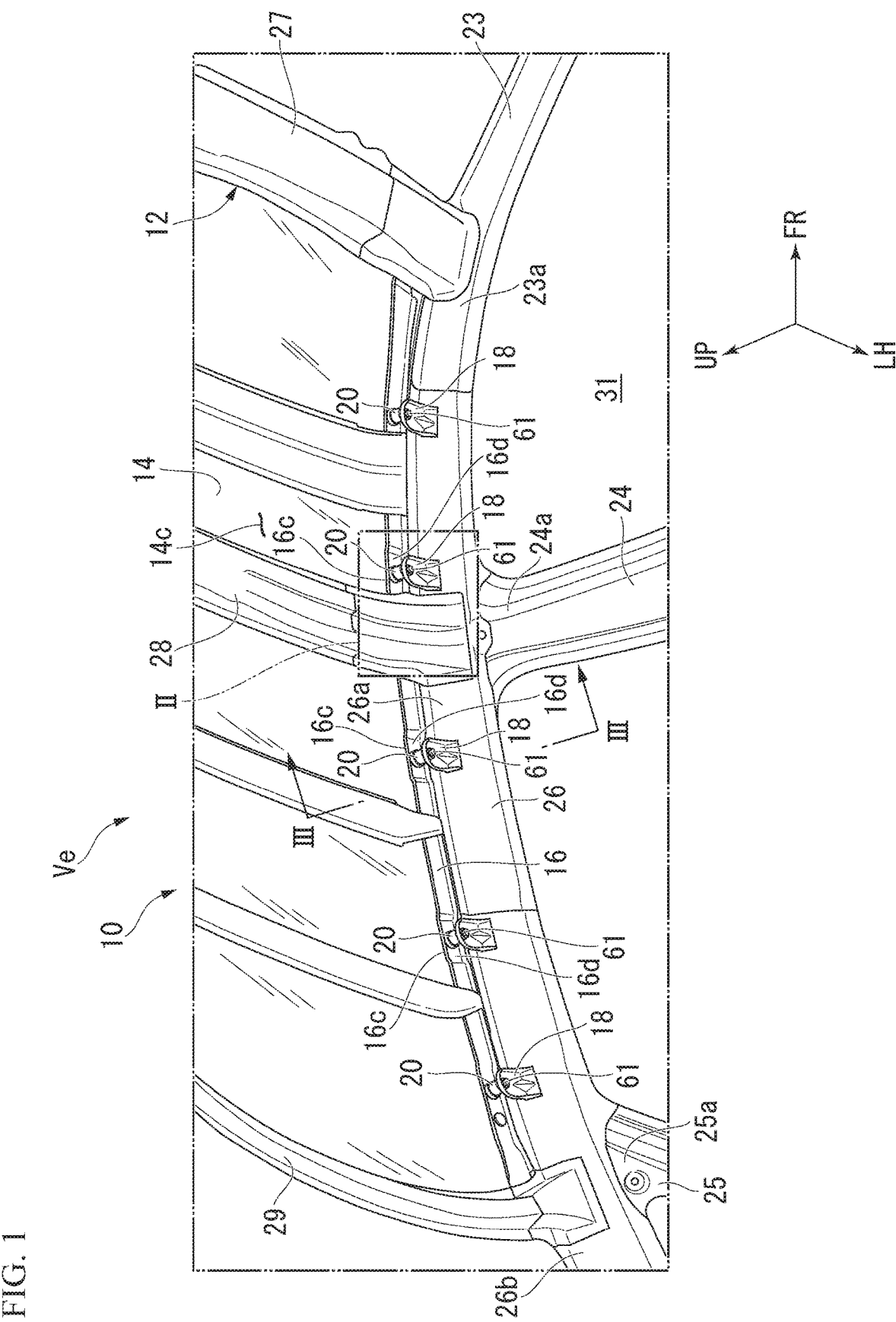
FIG. 1 is a perspective view of a vehicle body upper part structure that includes an article fixation apparatus according to a first embodiment of the present invention when seen from a vehicle room side.

Hereinafter, an article fixation apparatus and an article fixation structure assembly method according to embodiments of the present invention will be described with reference to the drawings. In the drawings, an arrow FR indicates a frontward direction of a vehicle, an arrow UP indicates an upward direction of the vehicle, and an arrow LH indicates a leftward direction of the vehicle. The embodiment is described using an example of a left side of a vehicle body Ve as a vehicle body upper part structure 10 that includes an article fixation apparatus 20; however, a right side of the vehicle body Ve also has a similar configuration.

First Embodiment

Figure 2:
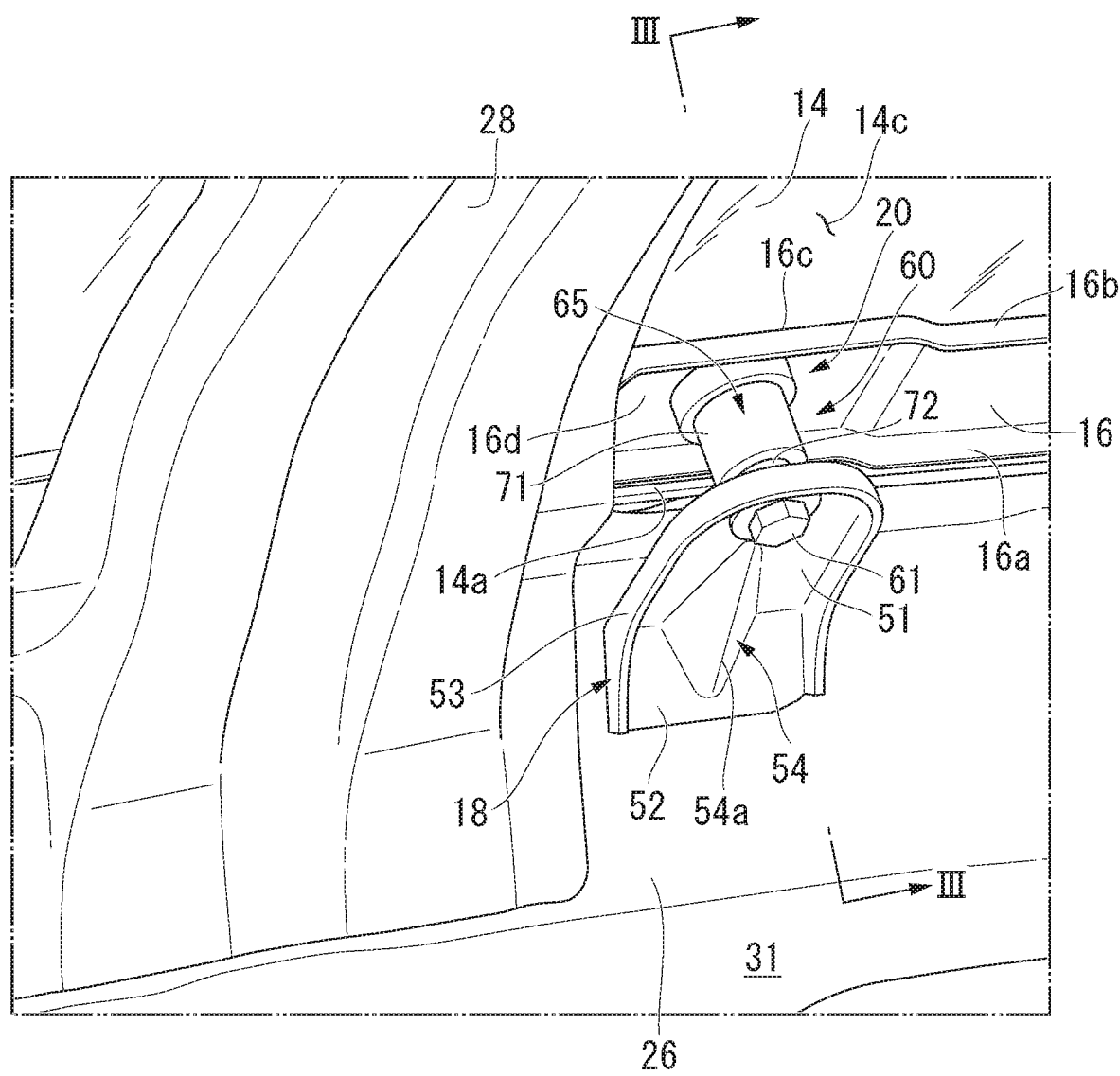
FIG. 2 is an enlarged perspective view of a part II of FIG. 1.
Figure 3:
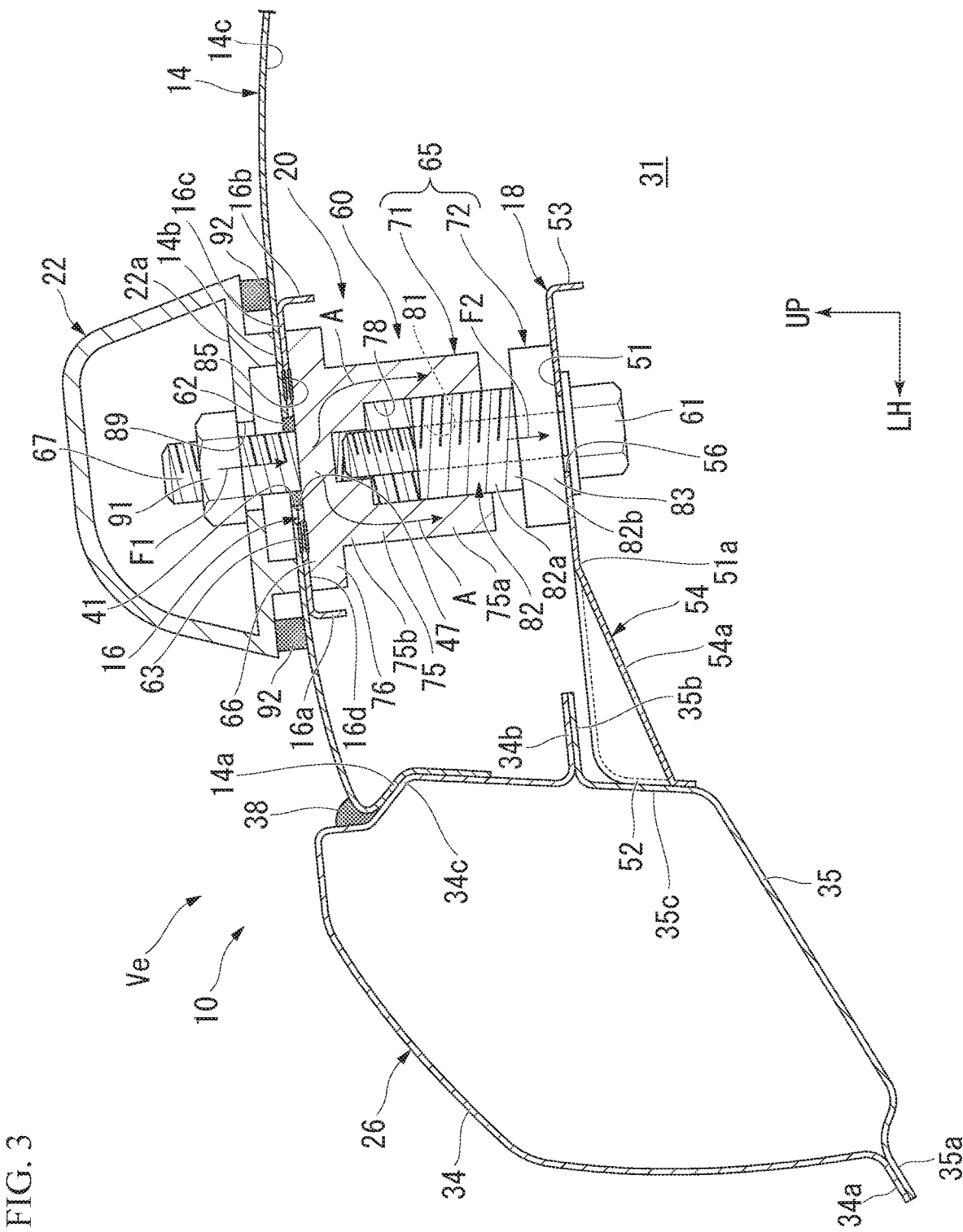
FIG. 3 is a cross-sectional view along a line of FIG. 2.

As shown in FIG. 1 and FIG. 2, the vehicle body upper part structure 10 includes a vehicle body skeleton member 12, a roof panel (vehicle body panel, first plate) 14, a reinforcement member 16, a plurality of support members (second plate) 18, a plurality of article fixation apparatuses 20, and a roof rail (article) 22 (refer to FIG. 3).

The vehicle body skeleton member 12 includes a front pillar 23, a center pillar 24, a quarter pillar 25, a roof side rail 26, a front roof cross member 27, a center roof cross member 28, and a quarter roof cross member 29.

The front pillar 23 is raised at a front left part of a vehicle room 31 and is formed in a closed cross-section. The front roof cross member 27 is provided to be directed in a vehicle width direction so as to connect an upper end part 23a of the left front pillar 23 and an upper end part (not shown) of the right front pillar.

The center pillar 24 is raised at a middle left part of the vehicle room 31 and is formed in a closed cross-section. The quarter pillar 25 is raised at a rear left part of the vehicle room 31 and is formed in a closed cross-section.

The roof side rail 26 is connected to an upper end part 23a of the front pillar 23, an upper end part 24a of the center pillar 24, and an upper end part 25a of the quarter pillar 25.

As shown in FIG. 3, the roof side rail 26 includes, for example, an outer side rail 34 and an inner side rail 35. The outer side rail 34 forms an upper part of the roof side rail 26 and includes a first outer flange 34a that protrudes outward in the vehicle width direction and a first inner flange 34b that protrudes inward in the vehicle width direction. The inner side rail 35 forms a lower part of the roof side rail 26 and includes a second outer flange 35a that protrudes outward in the vehicle width direction and a second inner flange 35b that protrudes inward in the vehicle width direction.

The first outer flange 34a and the second outer flange 35a are joined to each other. The first inner flange 34b and the second inner flange 35b are joined to each other. Thereby, the roof side rail 26 is formed in a closed cross-section by the outer side rail 34 and the inner side rail 35.

With reference back to FIG. 1, the center roof cross member 28 is provided to be directed in the vehicle width direction so as to connect a region 26a of the left roof side rail 26 near the middle in a front-to-rear direction of the vehicle body and a region (not shown) of the right roof side rail near the middle in the front-to-rear direction of the vehicle body. The quarter roof cross member 29 is provided to be directed in the vehicle width direction so as to connect a vehicle body rear part 26b of the left roof side rail 26 and a vehicle body rear part (not shown) of the right roof side rail.

The roof panel 14 is supported by the roof side rail 26, the front roof cross member 27, the center roof cross member 28, and the quarter roof cross member 29.

An outer circumference part of the roof panel 14 is formed in a rectangular shape in a plan view along the left roof side rail 26, the right roof side rail, the front roof cross member 27, and the quarter roof cross member 29.

As shown in FIG. 3, a left part (outside part) 14a of the roof panel 14 is formed along an inner part 34c of the outer side rail 34, and the left part 14a and the inner part 34c are joined together by brazing at a brazing joint part 38. The roof panel 14 has a rail attachment region 14b along the left part 14a close to the left part 14a and a plurality of first penetration holes (penetration hole) 41 (also refer to FIG. 4) provided at intervals in the vehicle body front-to-rear direction on the rail attachment region 14b.

As shown in FIG. 1 and FIG. 3, the reinforcement member 16 extends in a band shape in the vehicle body front-to-rear direction along the left part 14a (also refer to FIG. 3) at a lower surface 14c of the roof panel 14. An outer side 16a of the reinforcement member 16 is bent downward. An inner side 16b of the reinforcement member 16 is bent downward. A plurality of raised parts 16c are formed on the reinforcement member 16 at intervals in the vehicle body front-to-rear direction. The plurality of raised parts 16c are joined to the lower surface 14c of the roof panel 14.

Figure 4:
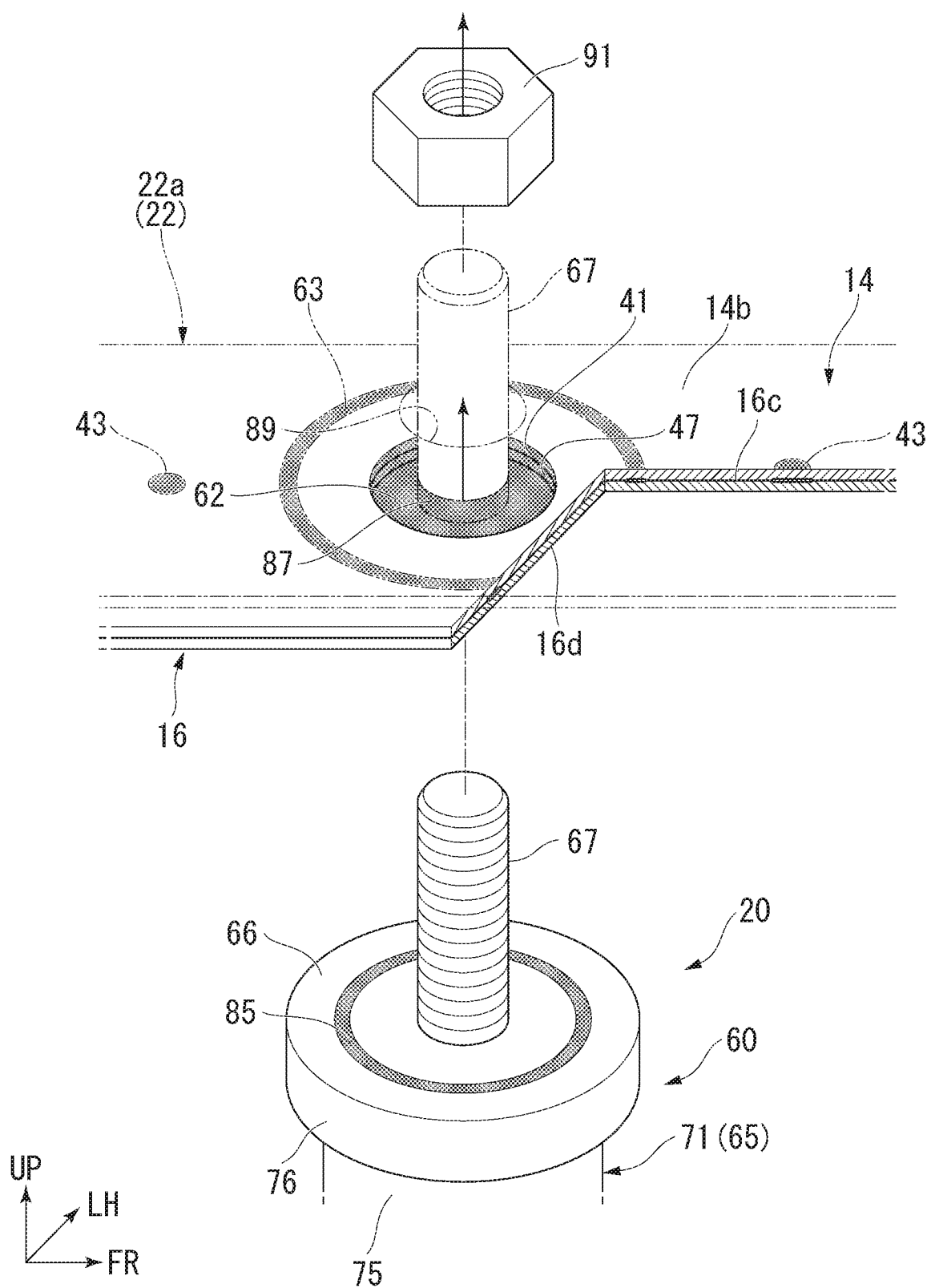
FIG. 4 is an exploded perspective view showing the article fixation apparatus according to the first embodiment.

As shown in FIG. 3 and FIG. 4, the raised part 16c of the reinforcement member 16 is positioned above a first penetration hole 41 of the lower surface 14c of the roof panel 14 and is joined, for example, by spot welding or an adhesive, to a region 43 that is covered by the roof rail 22 from a vehicle body upward direction.

In this way, the reinforcement member 16 is joined to the region 43 of the lower surface 14c of the roof panel 14 that is covered by the roof rail 22 from the vehicle body upward direction. Thereby, the region 43 (for example, a welding trace when joining by spot welding or the like) at which the reinforcement member 16 is joined to the roof panel 14 can be covered by the roof rail 22 from the vehicle body upward direction, and it is possible to ensure an appearance property (visual quality).

Further, a second seal material 63 is provided throughout the entire circumference of the first penetration hole 41 between the raised part 16c of the reinforcement member 16 and the lower surface 14c of the roof panel 14. The second seal material 63 will be described in detail later.

The raised part 16c has a second penetration hole 47. The second penetration hole 47 is arranged below the first penetration hole 41 of the roof panel 14.

A plurality of support members 18 (also refer to FIG. 1) are arranged at intervals below the plurality of raised parts 16c. The plurality of support members 18 are joined to an inner part (attachment part on the vehicle body Ve side) 35c of the inner side rail 35. Hereinafter, the attachment part 35c on the vehicle body Ve side is referred to as a "vehicle body-side attachment part 35c." The article fixation apparatus 20 is interposed between the reinforcement member 16 and the support member 18.

As shown in FIG. 2 and FIG. 3, the support member 18 includes a support attachment part 51, a base end part 52, a circumference part 53, and a brace (gusset) 54. In the support member 18, for example, the support attachment part 51, the base end part 52, the circumference part 53, and the brace 54 are integrally molded of a single plate material.

The support attachment part 51 is arranged below the raised part 16c of the reinforcement member 16 and is formed to be flat along the raised part 16c. For example, a front end of the support attachment part 51 is formed in a curved shape that protrudes inward in the vehicle width direction, and a base end of the support attachment part 51 is formed in a straight line shape that extends in the vehicle body front-to-rear direction. The base end part 52 is formed on a base end of the support attachment part 51. The support attachment part 51 has an attachment hole 56 in a region near the front end.

The base end part 52 is bent downward from a base end of the support attachment part 51 along the vehicle body-side attachment part 35c. The base end part 52 is joined to the vehicle body-side attachment part 35c, and thereby, the support member 18 is supported in a cantilever manner by the vehicle body-side attachment part 35c. The circumference part 53 is formed in the vicinity of the support attachment part 51 and the base end part 52. The circumference part 53 is bent downward from a vicinity of the support attachment part 51 and is bent from a vicinity of the base end part 52 inward in the vehicle width direction. The support attachment part 51 is reinforced by the circumference part 53.

The brace 54 is formed on the support attachment part 51 and the base end part 52. The brace 54 is provided on the base end part 52 and the support attachment part 51. A lower side 54a of the brace 54 extends inward (in the vehicle width inward direction) in the vehicle width direction with an upward slope from the base end part 52 to a region 51a of the support attachment part 51 close to the attachment hole 56. In this way, in a state where the support member 18 is supported by the vehicle body-side attachment part 35c in a cantilever manner, by providing the brace 54 on the support member 18, the support member 18 is reinforced by the brace 54, and the strength and rigidity of the support member 18 are ensured.

As shown in FIG. 3 and FIG. 4, the support attachment part 51 of the support member 18 is arranged below and is spaced from the raised part 16c of the reinforcement member 16. The article fixation apparatus 20 is interposed between the raised part 16c and the support attachment part 51.

The article fixation apparatus 20 includes a roof rail attachment member 60 (article attachment member), a fastening bolt 61, a first seal material 62, and a second seal material 63. The roof rail attachment member 60 includes an adjustment mechanism 65, a head part seat surface 66, and a protrusion part 67. The adjustment mechanism 65 includes a fit recess member (one member) 71 and a fit protrusion member (another member, the other member) 72.

The fit recess member 71 has a cylindrical part 75 and a protrusion top part 76. The cylindrical part 75 is formed in a hollow cylindrical shape by a cylindrical wall 75a, and a female screw 78 is formed on an inner circumferential surface of the cylindrical wall 75*a*.

The protrusion top part 76 is provided integrally with a top portion 75*b* of the cylindrical part 75. The top portion 75*b* of the cylindrical part 75 is closed by the protrusion top part 76. The protrusion top part 76 is formed in a circular plate shape and protrudes radially outward from the cylindrical wall 75*a* of the cylindrical part 75. The head part seat surface 66 is formed in a circular shape at an upper surface of the protrusion top part 76. The protrusion part 67 protrudes from a center of the head part seat surface 66 to the opposite side of the cylindrical part 75. The protrusion part 67 is constituted of a male screw part. The head part seat surface 66 and the protrusion part 67 will be described in detail later.

The fit protrusion member 72 is fitted to the female screw 78 of the cylindrical part 75 of the fit recess member 71. The fit protrusion member 72 includes a protrusion part screw hole 81 that penetrates through the fit protrusion member 72 coaxially with the fit protrusion member 72, a protrusion shape part 82, and a protrusion bottom part 83. A male screw 82*a* is formed on an outer circumferential surface of the protrusion shape part 82 to be capable of being screwed to the female screw 78 of the cylindrical part 75. The male screw 82*a* of the protrusion shape part 82 is screwed to the female screw 78 of the cylindrical part 75, and thereby, the protrusion shape part 82 is fitted to the cylindrical part 75 to be able to be extended and retracted. Thereby, it is possible to adjust a size in an axial direction of the adjustment mechanism 65.

The protrusion bottom part 83 is provided integrally with the bottom portion 82*b* of the protrusion shape part 82. The protrusion bottom part 83 is formed in a circular plate shape and protrudes radially outward from an outer circumferential wall of the protrusion shape part 82. The protrusion bottom part 83 is placed on the support attachment part 51 of the support member 18. In this state, the protrusion part screw hole 81 is arranged above the attachment hole 56 of the support attachment part 51. The fastening bolt 61 penetrates through the attachment hole 56 from below, and the penetrating fastening bolt 61 is screwed to the protrusion part screw hole 81. Thereby, the fit protrusion member 72 is fixed to the support attachment part 51. In other words, the support attachment part 51 is fastened to the fit protrusion member 72 using the fastening bolt 61. That is, the adjustment mechanism 65 is fixed to the vehicle body-side attachment part 35*c* via the support member 18.

A shape of the attachment hole 56 of the support member 18 is formed to allow position adjustment in a direction that intersects an axial direction of the fastening bolt 61 in a state where the fastening bolt 61 penetrates through the attachment hole 56. Specifically, for example, the attachment hole 56 is formed such that an inner diameter dimension of the attachment hole 56 is larger than an outer diameter dimension of the fastening bolt 61 to allow position adjustment (so-called a clearance hole). As another example, it is also possible to allow position adjustment in the direction that intersects the axial direction of the fastening bolt 61 by forming the attachment hole 56 as an elongated hole.

The head part seat surface 66 and the protrusion part 67 are provided integrally with the protrusion top part 76 of the adjustment mechanism 65. The head part seat surface 66 is formed in a circular shape by an upper surface of the protrusion top part 76. The head part seat surface 66 is joined to a lower surface 16*d* of the reinforcement member 16 (specifically, the raised part 16*c*) at an annular joint part 85 throughout the entire circumference of the first penetration hole 41, for example, by ring projection welding, an adhesive, or the like. Accordingly, the joint part 85 closes a space between the head part seat surface 66 and the lower surface 16*d* of the raised part 16*c* throughout the entire outer circumference of the gap 87 between the first penetration hole 41 and the protrusion part 67.

The protrusion part 67 protrudes from the head part seat surface 66 of the protrusion part 67 coaxially with the fit recess member 71. The protrusion part 67 is constituted of a male screw part. The protrusion part 67 penetrates through the second penetration hole 47 of the reinforcement member 16 and the first penetration hole 41 of the roof panel 14 from a vehicle inside of the reinforcement member 16 to a vehicle outside of the roof panel 14. The roof rail 22 is attached to the protrusion part 67 that protrudes upward from the roof panel 14.

Specifically, a base attachment hole 89 is formed on a base 22*a* of the roof rail 22. The protrusion part 67 that penetrates through the base attachment hole 89 protrudes above the base 22*a*. By screwing a nut 91 to the protrusion part 67 that protrudes above the base 22*a*, the roof rail 22 is attached to the protrusion part 67 and is fixed to an upper surface of the roof panel 14. In this state, a seal material 92 is interposed between an inner part of the roof rail 22 and the upper surface of the roof panel 14. Further, the seal material 92 is interposed between an outer part of the roof rail 22 and the upper surface of the roof panel 14.

Further, the protrusion part 67 of the roof rail attachment member 60 protrudes to the vehicle outside of the roof panel 14. Accordingly, when the roof rail 22 is attached to the roof panel 14, by fitting the base attachment hole 89 of the roof rail 22 to the protrusion part 67, the protrusion part 67 can be also used as a positioning reference of the roof rail 22. Thereby, it is possible to enhance attachment workability when the roof rail 22 is attached to the upper surface of the roof panel 14.

When the vehicle body Ve is assembled, for example, it is conceivable that a position of the vehicle body-side attachment part 35*c* may be displaced due to an assembly tolerance or the like. Further, it is conceivable that the position of the roof panel 14 may be displaced when the roof panel 14 is attached to the roof side rail 26 by brazing. For this reason, it is conceivable that a relative position between the support member 18 and the roof panel 14 may be displaced. Therefore, the adjustment mechanism 65 is interposed between the support member 18 and the roof panel 14 (specifically, the reinforcement member 16). Thereby, by adjusting the adjustment mechanism 65 in accordance with a position displacement between the support member 18 and the roof panel 14, the adjustment mechanism 65 can absorb the position displacement between the support member 18 and the roof panel 14.

Specifically, the fit recess member 71 of the adjustment mechanism 65 is joined to the roof panel 14 via the reinforcement member 16, and the fit protrusion member 72 of the adjustment mechanism 65 is fixed to the vehicle body-side attachment part 35*c* via the support member 18. Accordingly, the position displacement in the vertical direction of the roof panel 14 when the roof panel 14 is joined by brazing to the roof side rail 26, and the position displacement in the vertical direction of the support member when the support member 18 is fixed to the vehicle body-side attachment part 35*c* can be absorbed by adjusting a screwing state of the adjustment mechanism 65.

Further, it is conceivable that, in a state where the roof panel 14 is attached to the roof side rail 26 and the support member 18 is attached to the vehicle body-side attachment part 35c, the support member 18 and the roof panel 14 may be displaced in a direction that intersects an axis line direction of the fastening bolt 61.

Therefore, the attachment hole 56 of the support member 18 is formed to allow positon adjustment of the fastening bolt 61 in the direction that intersects the axis line direction. Thereby, by adjusting the position of the fastening bolt 61 in accordance with the relative displacement between the support member 18 and the roof panel 14, the displacement between the support member 18 and the roof panel 14 can be absorbed by the attachment hole.

Further, the protrusion part 67 is provided integrally with the adjustment mechanism 65, and the roof rail 22 is fixed to the roof panel 14 using the protrusion part 67. Therefore, a load F1 input from the roof rail 22 that is a relatively heavy object can be appropriately transmitted to the adjustment mechanism 65 via the protrusion part 67 as indicated by an arrow A. Thereby, the load F1 input from the roof rail 22 can be satisfactorily supported by the entire adjustment mechanism 65.

Further, the protrusion part 67 is provided integrally with the fit recess member 71 of the adjustment mechanism 65, and the fit recess member 71 is screwed to the fit protrusion member 72 of the adjustment mechanism 65. Therefore, it is possible to integrate the protrusion part 67, the fit recess member 71, and the fit protrusion member 72. Thereby, the load F1 input from the roof rail 22 can be appropriately transmitted to the adjustment mechanism 65 via the protrusion part 67.

Further, the reinforcement member 16 is joined to the lower surface 14c of the roof panel 14 around the first penetration hole 41. Accordingly, the roof panel 14 around the first penetration hole 41 to which the relatively large load F1 is input from the protrusion part 67 and the roof rail 22 can be reinforced by the reinforcement member 16. Thereby, the entire thickness dimension of the roof panel 14 can be reduced, and the weight of the roof panel 14 (that is, the vehicle body) can be reduced.

Further, the support member 18 is reinforced by the brace 54 by providing the brace 54 on the support member 18. Accordingly, when the load F1 input from the roof rail 22 is transmitted to the support member 18 via the adjustment mechanism 65, the transmitted load F2 can be appropriately supported by the support member 18. Thereby, the load F2 transmitted to the support member 18 can be satisfactorily transmitted to the vehicle body Ve via the support member 18 and the vehicle body-side attachment part 35c.

The first seal material 62 is provided in the gap 87 between the first penetration hole 41 and the protrusion part 67. Examples of the first seal material 62 include a seal material that is applied in a liquid state at the time of use and that is cured at room temperature after application, a grommet, and the like. By providing the first seal material 62 in the gap 87 between the first penetration hole 41 and the protrusion part 67, water permeation from the gap 87 to the vehicle inside of the roof panel 14 is prevented. Thereby, it is possible to obtain a seal effect which can prevent water permeation from the roof panel 14 to the vehicle inside with a simple configuration.

Further, the head part seat surface 66 is joined to the lower surface 16d of the reinforcement member 16 (specifically, the raised part 16c), for example, at the annular joint part 85 throughout the entire circumference of the second penetration hole 47 and the first penetration hole 41 by ring projection welding, an adhesive, or the like. Accordingly, with a simple configuration in which the head part seat surface 66 is joined to the lower surface 16d of the raised part 16c, it is possible to obtain an annular seal effect throughout the entire outer circumference of the gap 87 between the first penetration hole 41 and the protrusion part 67. Thereby, it is possible to further enhance a reliable seal effect with a simple seal configuration.

Further, the second seal material 63 is provided in an annular shape throughout the entire circumference of the second penetration hole 47 and the first penetration hole 41 between the raised part 16c and the lower surface 14c of the roof panel 14. Examples of the second seal material 63 include a seal material that is applied in a liquid state at the time of use and that is cured at room temperature after application.

In this way, by providing the second seal material 63 in an annular shape throughout the entire circumference of the second penetration hole 47 and the first penetration hole 41, the space between the raised part 16c and the lower surface 14c of the roof panel 14 can be closed with the second seal material 63 throughout the entire circumference of the first penetration hole 41. Thereby, it is possible to obtain a seal effect with respect to the gap 87 of the first penetration hole 41 and the protrusion part 67, and it is possible to further enhance a reliable seal effect a simple seal configuration.

Next, an assembly method of the article fixation apparatus 20 according to the first embodiment will be described with reference to FIG. 3 and FIG. 4.

As shown in FIG. 3 and FIG. 4, in a first step, by screwing the male screw 82a of the fit protrusion member 72 to the female screw 78 of the fit recess member 71 of the adjustment mechanism 65, the fit recess member 71 and the fit protrusion member 72 (that is, the adjustment mechanism 65) are integrally connected to each other.

The protrusion part 67 is provided integrally with the adjustment mechanism 65. The protrusion part 67 is allowed to protrude from the second penetration hole 47 of the reinforcement member 16 (specifically, the raised part 16c). After the protrusion part 67 is allowed to protrude from the second penetration hole 47, the head part seat surface 66 is joined to the lower surface 16d of the raised part 16c at the joint part 85 together with the adjustment mechanism 65. By joining the head part seat surface 66 to the lower surface 16d of the raised part 16c, the protrusion part 67 is allowed to protrude from the first penetration hole 41 of the roof panel 14 to the vehicle outside.

In a second step, the raised part 16c of the reinforcement member 16 is fixed to the lower surface 14c of the roof panel 14 in a state where the protrusion part 67 is allowed to protrude from the first penetration hole 41 of the roof panel 14 to the vehicle outside. Specifically, the raised part 16c is joined to the region 43 of the lower surface 14c of the roof panel 14 that is located around the first penetration hole 41 and that is covered by the roof rail 22 from the vehicle body upward direction.

In a third step, the adjustment mechanism 65 is fixed to the support member 18. Specifically, the protrusion bottom part 83 of the adjustment mechanism 65 is placed on the support attachment part 51 of the support member 18. After the protrusion bottom part 83 is placed on the support attachment part 51, the fastening bolt 61 is allowed to penetrate through the attachment hole 56 of the support attachment part 51 from below, and the penetrating fastening bolt 61 is screwed to the protrusion part screw hole 81. Thereby, the adjustment mechanism 65 is fixed to the support attachment part 51.

In this state, by providing the first seal material 62 in the gap 87 between the first penetration hole 41 and the protrusion part 67, water permeation from the gap 87 is prevented.

According to the assembly method of the article fixation apparatus 20, after the head part seat surface 66 is fixed to the lower surface 16d of the raised part 16c together with the adjustment mechanism 65 in the first step, the raised part 16c (that is, the reinforcement member 16) is fixed to the roof panel 14 in the second step. Further, in the third step, the adjustment mechanism 65 is fixed to the support member 18 (that is, the support attachment part 51). Thereby, in a state where the protrusion part 67 is allowed to protrude from the roof panel 14 to the vehicle outside, the adjustment mechanism 65 can be easily assembled to be interposed between the reinforcement member 16 and the support member 18.

Further, by providing the first seal material 62 in the gap 87 between the first penetration hole 41 and the protrusion part 67, water permeation to the vehicle inside of the roof panel 14 from the gap 87 is prevented. Thereby, it is possible to obtain a seal effect which can prevent water permeation from the roof panel 14 to the vehicle inside with a simple configuration.

Next, vehicle body upper part structures 100, 110, and 130 according to second to fourth embodiments will be described with reference to FIG. 5 to FIG. 9. In the vehicle body upper part structures 100, 110, and 130 of the second to fourth embodiments, configuration members which are the same as or similar to those of the vehicle body upper part structure 10 of the first embodiment are given by the same reference numerals, and detailed descriptions thereof will be omitted.

Second Embodiment

As shown in FIG. 5, the vehicle body upper part structure 100 is obtained by replacing the support member 18 of the first embodiment with a support member 102, and other configurations are the same as those of the vehicle body upper part structure 10 of the first embodiment.

The support member 102 is a cross member which is provided so as to connect the left roof side rail (left frame) 26 and the right roof side rail (right frame) (not shown) and which extends in the vehicle width direction along the roof panel 14.

Examples of the support member 102 include a roof arch that reinforces the roof panel 14 and the like, and a skeleton member of a sunroof for opening and closing a roof.

A left end part of the support member 102 has a support attachment part 104. The support attachment part 104 is provided below and is spaced from the raised part 16c of the reinforcement member 16 similarly to the support attachment part 51 of the first embodiment. The adjustment mechanism 65 is interposed between the raised part 16c of the reinforcement member 16 and the support attachment part 104 similarly to the first embodiment.

According to the vehicle body upper part structure 100, by employing the support member 102 as the cross member that is provided so as to connect the left roof side rail 26 and the right roof side rail, both ends of the support member 102 can be supported by the left and right roof side rails 26. Thereby, it is possible to enhance the rigidity of the support member 102, and in a case where the article is the roof rail 22, the load input from the roof rail 22 can be appropriately supported by the support member 102. Further, in a case where a roof rack is employed as the article, luggage is loaded on the roof rack. Even in this case, a relatively large load due to the luggage on the roof rack can be satisfactorily supported by the support member 102.

Further, by providing the support member 102 so as to connect the left roof side rail 26 and the right roof side rail, for example, an impact load due to a side impact input from the left and right roof side rails 26 can be satisfactorily supported by the support member 102.

Third Embodiment

Figure 6:
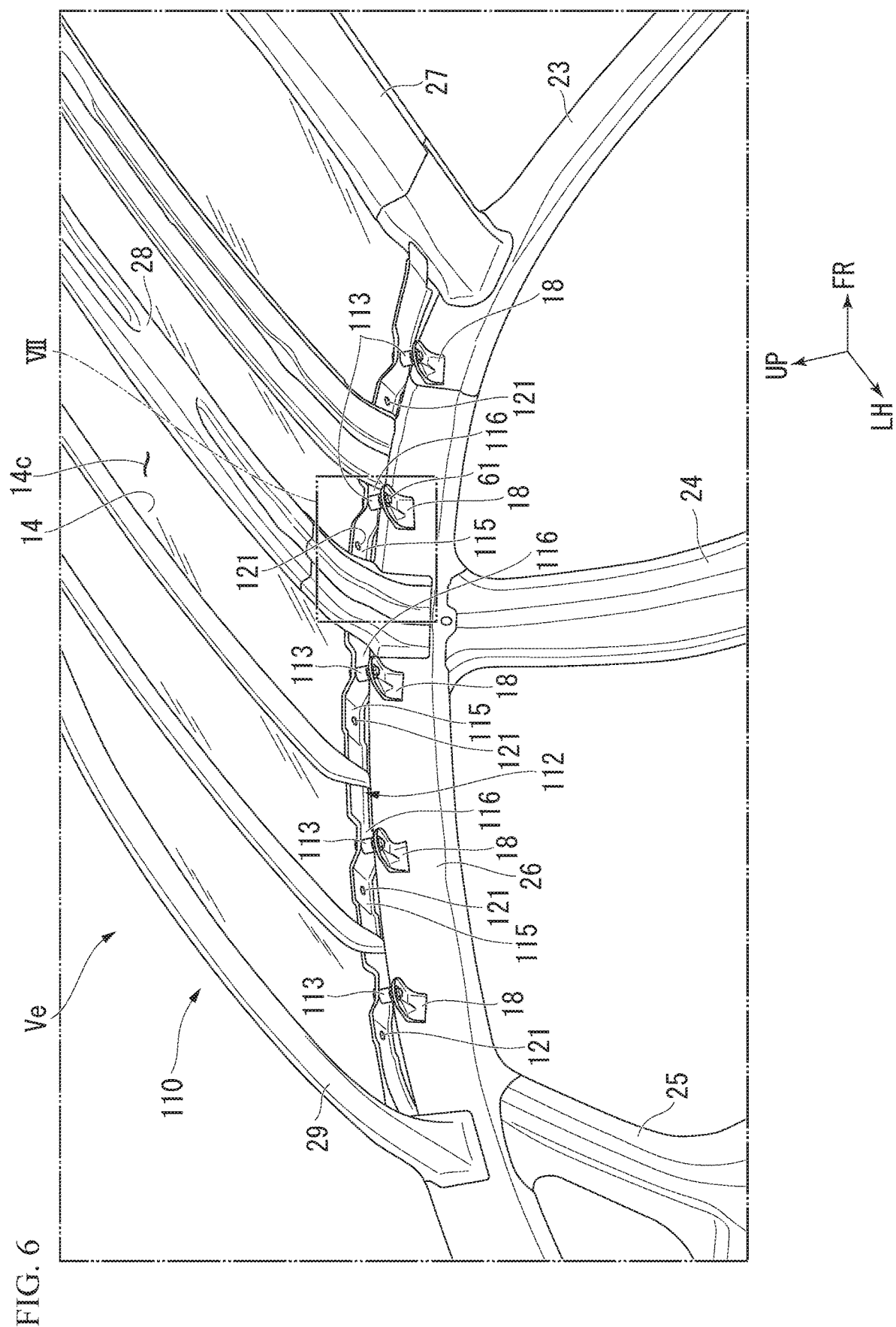
FIG. 6 is a perspective view of a vehicle body upper part structure that includes an article fixation apparatus according to a third embodiment when seen from the vehicle room side.
Figure 7:
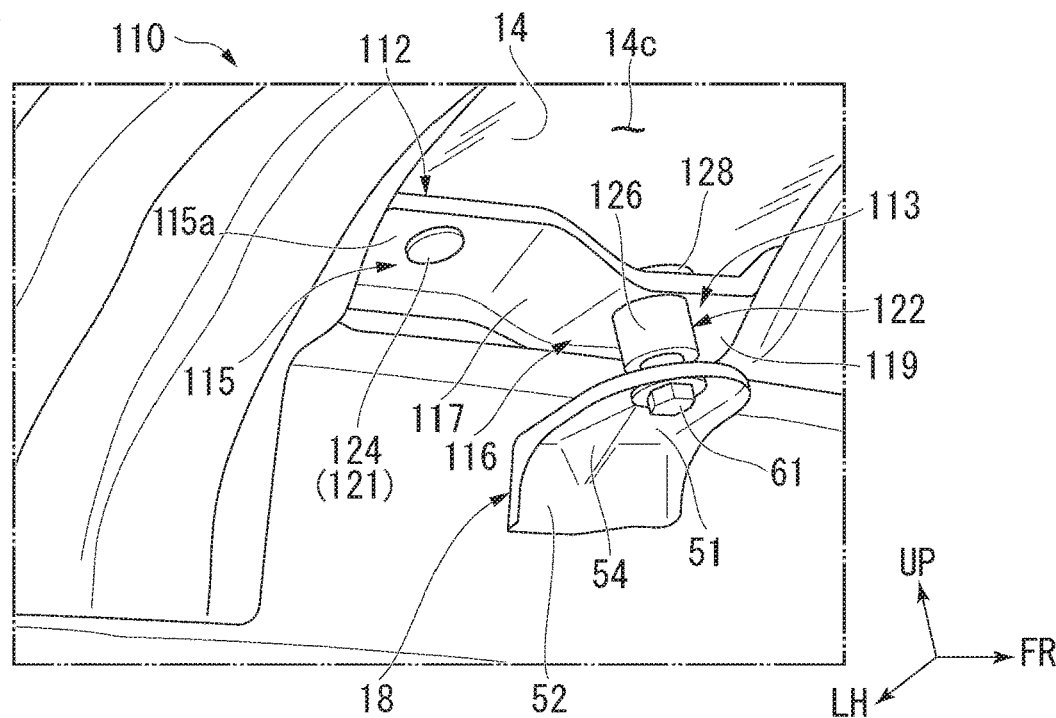
FIG. 7 is an enlarged perspective view of a part VII of FIG. 6.
Figure 8:
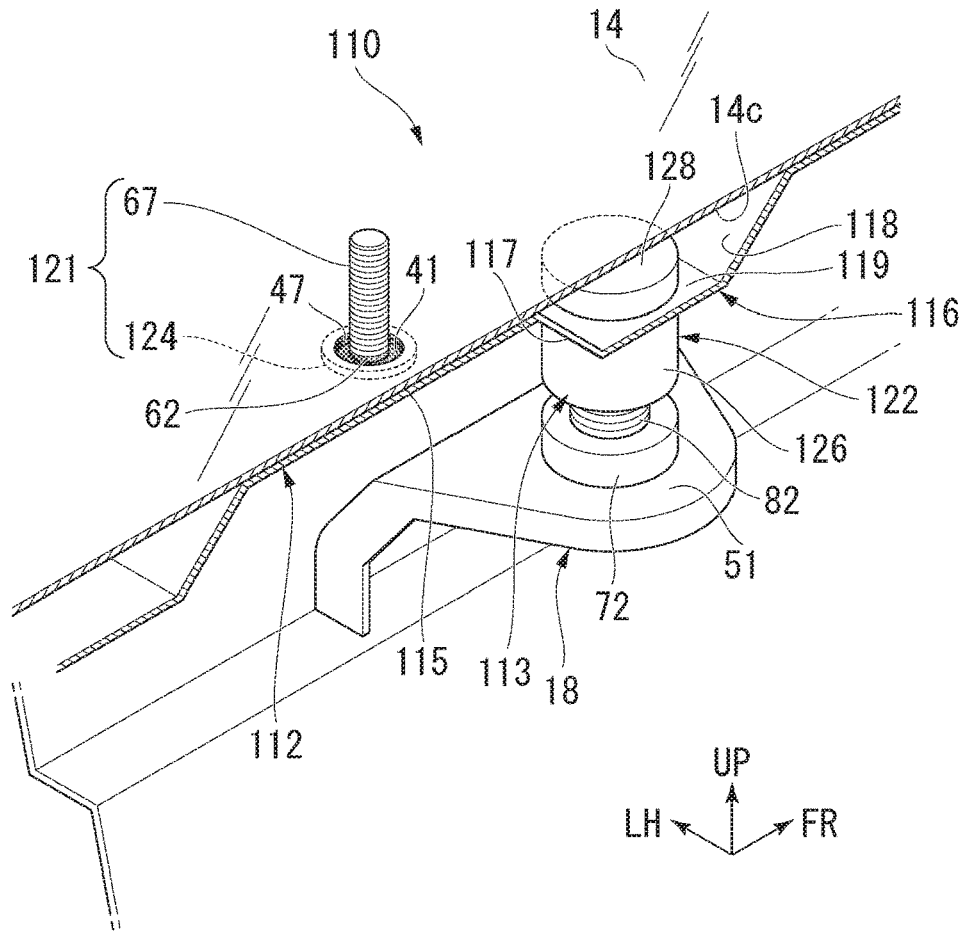
FIG. 8 is a perspective view showing the article fixation apparatus according to the third embodiment.

As shown in FIG. 6 to FIG. 8, the vehicle body upper part structure 110 is obtained by replacing the reinforcement member 16 and the roof rail attachment member 60 of the first embodiment with a reinforcement member 112 and a roof rail attachment member 113 (article attachment member), and other configurations are the same as those of the vehicle body upper part structure 10 of the first embodiment.

The reinforcement member 112 has a plurality of first attachment fixation parts 115 to which the roof rail 22 (refer to FIG. 3) is fixed, and a plurality of second attachment fixation parts 116 to which the adjustment mechanism 122 of the roof rail attachment member 113 is fixed.

The first attachment fixation part 115 is arranged in contact with the lower surface 14c of the roof panel 14. A fixation part 121 of the roof rail attachment member 113 is fixed to the first attachment fixation part 115. The second attachment fixation part 116 is provided at a position that is offset in the vehicle body front-to-rear direction relative to the first attachment fixation part 115.

Further, by allowing the second attachment fixation part 116 to protrude downward with respect to the first attachment fixation part 115, the second attachment fixation part 116 is arranged below and to be spaced from the lower surface 14c of the roof panel 14.

The second attachment fixation part 116 has a front slope portion 117, a rear slope portion 118, and a middle attachment portion 119. The front slope portion 117 extends in a vehicle body rearward direction with a downward slope from a rear end of the first attachment fixation part 115. The rear slope portion 118 is provided to be spaced in the vehicle body rearward direction from the front slope portion 117 and extends in the vehicle body rearward direction with an upward slope from a rear end of the middle attachment portion 119. The middle attachment portion 119 is provided between a rear end of the rear slope portion 118 and a front end of the front slope portion 117 and is connected to the rear end of the rear slope portion 118 and the front end of the front slope portion 117. The middle attachment portion 119 is arranged parallel to the support attachment part 51 of the support member 18.

The roof rail attachment member 113 includes a fixation part 121 and an adjustment mechanism 122. The protrusion part 67 and a head part seat surface 124 are provided integrally with the fixation part 121. The protrusion part 67 penetrates through the first penetration hole 41 of the roof panel 14 and the second penetration hole 47 (also refer to FIG. 4) of the first attachment fixation part 115 and protrudes upward from the roof panel 14 toward the vehicle outside. In this state, the head part seat surface 124 is joined to the lower surface 115a of the first attachment fixation part 115. By the roof rail 22 being attached to the protrusion part 67, the roof rail 22 is fixed to the upper surface of the roof panel 14 by the fixation part 121.

The adjustment mechanism 122 includes a fit recess member (one member) 126 and a fit protrusion member (another member, the other member) 127. The fit recess member 126 includes the cylindrical part 75 and a connecting member 128. For example, the fit recess member 126 is fixed to the middle attachment portion 119, by the cylindrical part 75 being arranged below the middle attachment portion 119, the connecting member 128 being arranged above the middle attachment portion 119, and the connecting member 128 being screwed to an upper portion of the cylindrical part 75.

By the protrusion shape part 82 of the fit protrusion member 72 being screwed to the female screw 78 (refer to FIG. 3) of the fit recess member 126 (specifically, the cylindrical part 75), the fit recess member 126 and the fit protrusion member 72 (that is, the adjustment mechanism 122) are integrally connected together. The fit protrusion member 72 is fixed to the support attachment part 51 of the support member 18 by screwing the fastening bolt 61 to the protrusion part screw hole 81 (refer to FIG. 3) of the fit protrusion member 72. In this state, the adjustment mechanism 122 is arranged at a position that is offset in the vehicle body front-to-rear direction relative to the fixation part 121 of the roof rail attachment member 113.

According to the vehicle body upper part structure 110, by offsetting the adjustment mechanism 122 and the fixation part 121 in the vehicle body front-to-rear direction, each of the adjustment mechanism 122 and the fixation part 121 can be arranged at an appropriate position. Specifically, the fixation part 121 can be arranged at a position where the roof rail 22 can be appropriately supported (for example, the middle of the roof rail 22), and the adjustment mechanism 122 can be arranged in the vicinity of the center pillar 24 that is a skeleton member of the vehicle body Ve.

Accordingly, the load transmitted from the roof rail 22 to the fixation part 121 can be appropriately dispersed to the reinforcement member 112, and the load transmitted from the fixation part 121 to the adjustment mechanism 122 via the reinforcement member 112 can be further satisfactorily transmitted to the center pillar 24 (that is, the vehicle body Ve). Thereby, the load input from the roof rail 22 can be satisfactorily supported by the vehicle body Ve.

Further, the second attachment fixation part 116 is arranged to be spaced downward from to the lower surface 14c of the roof panel 14. Accordingly, the middle attachment portion 119 of the second attachment fixation part 116 can be arranged parallel to the support attachment part 51 of the support member 18. The fit recess member 126 of the adjustment mechanism 122 is fixed to the middle attachment portion 119, and the fit protrusion member 72 of the adjustment mechanism 122 is fixed to the support attachment part 51. Accordingly, for example, in a situation where the roof panel 14 is formed in a curved surface that protrudes in the vehicle body outward direction, it is unnecessary for the adjustment mechanism 122 to include a configuration that corresponds to the curved surface of the roof panel 14, and it is possible to simplify the adjustment mechanism 122.

Further, by the second attachment fixation part 116 having the front slope portion 117 and the rear slope portion 118, the rigidity of the reinforcement member 112 can be enhanced by the front slope portion 117 and the rear slope portion 118. Thereby, the load of the roof rail 22 can be appropriately transmitted to the middle attachment portion 119 via the fixation part 121. The load transmitted to the middle attachment portion 119 is transmitted to the adjustment mechanism 122.

Fourth Embodiment

Figure 9:
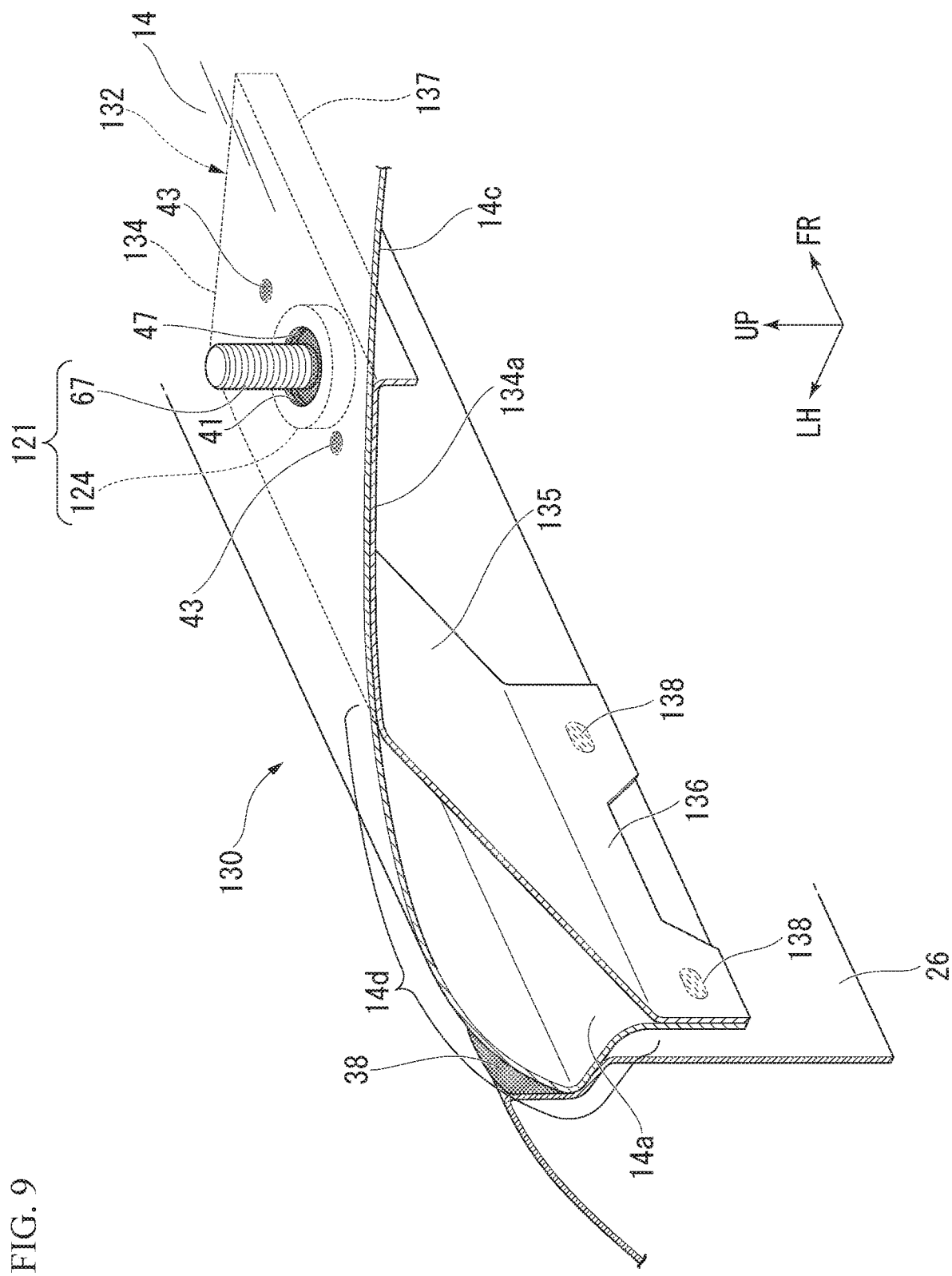
FIG. 9 is a perspective view showing a vehicle body upper part structure according to a fourth embodiment.

As shown in FIG. 9, the vehicle body upper part structure 130 is obtained by replacing the reinforcement member 112 of the third embodiment with a plurality of reinforcement members 132 and eliminating the support member 18 and the adjustment mechanism 122 from the third embodiment, and other configurations are the same as those of the vehicle body upper part structure 10 of the third embodiment.

The plurality of reinforcement members 132 are arranged along the roof side rail 26 at intervals in the vehicle body front-to-rear direction. The reinforcement member 132 includes a reinforcement attachment part 134, a reinforcement slope part 135, a reinforcement base end part 136, and a bent side 137.

The reinforcement attachment part 134 is formed in, for example, a rectangular shape in a plan view, and in a state of being in contact with the lower surface 14c of the roof panel 14 from below, the reinforcement attachment part 134 is joined to the region 43 of the roof panel 14 that is covered by the roof rail 22 from the vehicle body upward direction. The bent side 137 is bent downward from an inner end of the reinforcement attachment part 134.

Further, the reinforcement slope part 135 extends from an outer end of the reinforcement attachment part 134 to be sloped with a downward slope toward the left part 14a of the roof panel 14. The reinforcement base end part 136 is bent downward along the left part 14a of the roof panel 14 from an outer side of the reinforcement slope part 135.

The reinforcement base end part 136 is joined to the left part 14a of the roof panel 14 at a MIG joint portion 138, for example, by MIG welding. Accordingly, a closed cross-section having a substantially triangular shape is formed of the reinforcement slope part 135 and a left region part 14d of the roof panel 14. The left region part 14d includes a portion of the left part 14a. The MIG joint portion 138 is arranged at a position that is offset in the vehicle body front-to-rear direction with respect to the fixation part 121 described later.

The fixation part 121 is fixed to the reinforcement attachment part 134 similarly to the third embodiment. That is, the protrusion part 67 and the head part seat surface 124 are provided integrally with the fixation part 121. The protrusion part 67 penetrates through the first penetration hole 41 of the roof panel 14 and the second penetration hole 47 of the reinforcement attachment part 134 and protrudes upward from the roof panel 14 toward the vehicle outside. In this state, the head part seat surface 124 is joined to the lower surface 134a of the reinforcement attachment part 134.

By the roof rail 22 (refer to FIG. 3) being attached to the protrusion part 67, the roof rail 22 is fixed to the upper surface of the roof panel 14 by the fixation part 121.

According to the vehicle body upper part structure 130, the closed cross-section having a substantially triangular shape is formed of the reinforcement slope part 135 and the roof panel 14. Accordingly, it is possible to enhance the strength and rigidity of the reinforcement attachment part 134 that is joined to the roof panel 14 in the reinforcement member 132, and it is possible to enhance the positional accuracy of the reinforcement attachment part 134. Thereby, it becomes possible to support the load of the roof rail 22 (refer to FIG. 3) by the reinforcement attachment part 134, and the adjustment mechanism 122 of the third embodiment can be made unnecessary. That is, according to the fourth embodiment, the fixation part 121 constitutes the roof rail attachment member.

Further, the fixation part 121 is arranged at a position that is offset in the vehicle body front-to-rear direction with respect to the MIG joint portion 138 of MIG welding. Thereby, when the load of the roof rail 22 is input to the reinforcement attachment part 134, it is possible to avoid stress concentration on the MIG joint portion 138 due to the input load.

Further, the closed cross-section having a substantially triangular shape is formed of the reinforcement slope part 135 and the roof panel 14. Accordingly, when the load of the roof rail 22 is input to the reinforcement attachment part 134, it is possible to avoid stress concentration on the brazing joint part 38.

The fourth embodiment is described using an example in which the plurality of reinforcement members 132 are arranged at intervals in the vehicle body front-to-rear direction; however, as another example, for example, the reinforcement members 132 can integrally extend over the entire region of the vehicle body front-to-rear direction.

Next, roof rail attachment members 140, 150, 160, and 170 (article attachment member) according to the fifth to eighth embodiments will be described with reference to FIG. 10 to FIG. 14. In the roof rail attachment members 140, 150, 160, and 170 of the fifth to eighth embodiments, configuration members which are the same as or similar to the roof rail attachment member 60 of the first embodiment are given by the same reference numerals, and detailed descriptions thereof will be omitted.

Fifth Embodiment

Figure 10:
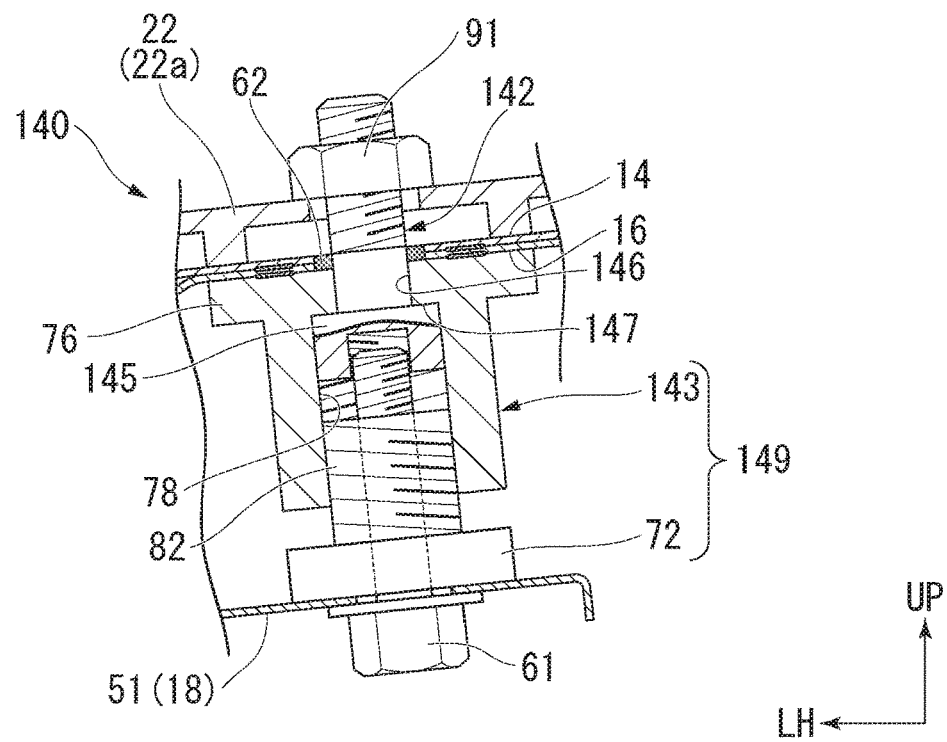
FIG. 10 is a cross-sectional view showing an article fixation apparatus according to a fifth embodiment.

As shown in FIG. 10, the roof rail attachment member 140 is obtained by replacing the protrusion part 67 and the fit recess member 71 of the first embodiment with a protrusion part 142 and a fit recess member (one member) 143, and other configurations are the same as those of the roof rail attachment member 60 of the first embodiment.

The protrusion part 142 is constituted of a screw part having a head portion 145 at a base end portion of the protrusion part 142. A protruding penetration hole 146 is formed on the fit recess member 143 along an axis line at a center of the protrusion top part 76 of the first embodiment, and a bottom surface 147 of the cylindrical part 75 is formed on an inner surface of the protrusion top part 76.

The protrusion part 142 is inserted from the female screw 78 side of the fit recess member 143 and protrudes to the outside of the fit recess member 143 from the protruding penetration hole 146. In this state, the head portion 145 of the protrusion part 142 is joined to the bottom surface 147 of the cylindrical part 75. Thereby, the protrusion part 142 is provided integrally with the fit recess member 143.

Examples of means for joining the head portion 145 and the bottom surface 147 include projection welding, MIG welding, laser welding, an adhesive, or the like.

According to the roof rail attachment member 140, by the head portion 145 of the protrusion part 142 being joined to the bottom surface 147 of the cylindrical part 75, the protrusion part 142 is provided integrally with the fit recess member 143. Further, the protrusion shape part 82 of the fit protrusion member 72 is screwed to the female screw 78 of the fit recess member 143. Accordingly, it is possible to integrate the protrusion part 142, the fit recess member 143, and the fit protrusion member 72. Thereby, the load input from the roof rail 22 can be appropriately transmitted to the fit recess member 143 and the fit protrusion member 72 (that is, the adjustment mechanism 149) via the protrusion part 142.

Further, by joining and integrating the head portion 145 of the protrusion part 142 to the bottom surface 147 of the fit recess member 143, the protrusion part 142 and the fit recess member 143 can be manufactured separately, and productivity can be improved.

Sixth Embodiment

Figure 11:
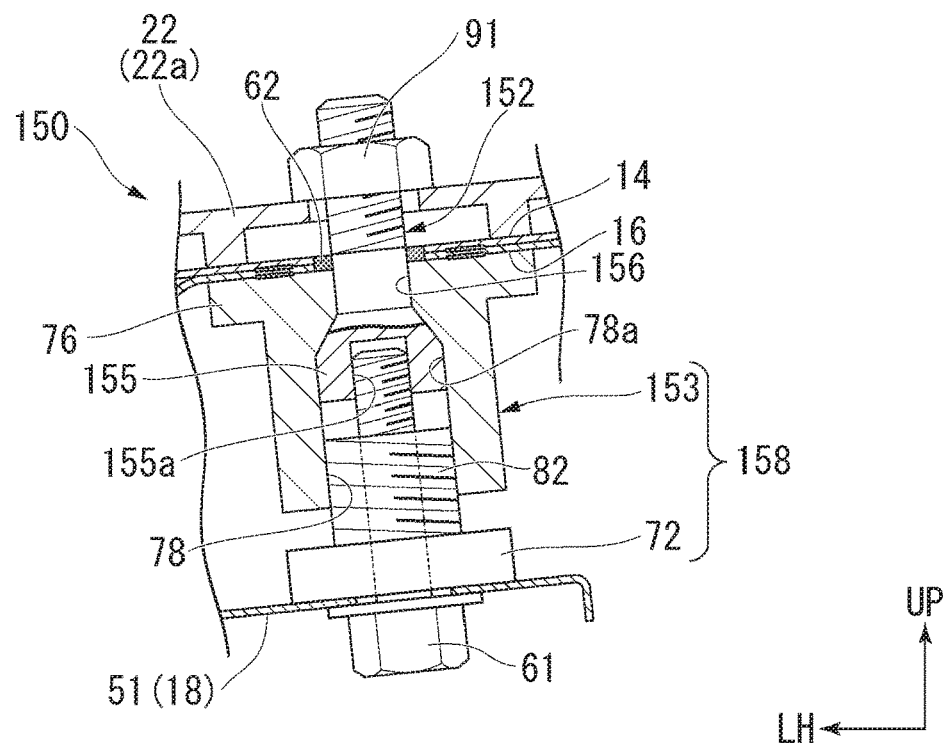
FIG. 11 is a cross-sectional view showing an article fixation apparatus according to a sixth embodiment.

As shown in FIG. 11, the roof rail attachment member 150 is obtained by replacing the protrusion part 67 and the fit recess member 71 of the first embodiment with a protrusion part 152 and a fit recess member (one member) 153, and other configurations are the same as those of the roof rail attachment member 60 of the first embodiment.

The protrusion part 152 is constituted of a screw part having a head portion 155 at a base end portion of the protrusion part 152. An insertion screw hole 155*a* is formed in the head portion 155. A protruding penetration hole 156 is formed on the fit recess member 153 along an axis line at the center of the protrusion top part 76 of the first embodiment. Further, the fit recess member 153 is formed such that a region (hereinafter, referred to as a bottom side region) 78*a* on the bottom portion side of the female screw 78 is able to be pressedly fitted to the head portion 155, and part of the bottom side region 78*a* is formed to have a diameter that is gradually reduced toward the protruding penetration hole 156.

The protrusion part 152 is inserted from the female screw 78 side of the fit recess member 153 and protrudes to the outside of the fit recess member 153 from the protruding penetration hole 156. In this state, the head portion 155 of the protrusion part 152 is pressed against the bottom side region 78*a* of the female screw 78. Further, the fastening bolt 61 is screwed to the insertion screw hole 155*a* in a state where the protrusion shape part 82 of the fit protrusion member 72 is screwed to the female screw 78 of the fit recess member 143. Thereby, the protrusion part 152, the fit recess member 153, and the fit protrusion member 72 are integrated.

According to the roof rail attachment member 150, the protrusion part 152, the fit recess member 153, and the fit protrusion member 72 are integrated. Thereby, the load input from the roof rail 22 can be appropriately transmitted to the fit recess member 153 and the fit protrusion member 72 (that is, the adjustment mechanism 158) via the protrusion part 152.

Further, by pressing the head portion 155 of the protrusion part 152 to the inside of the fit recess member 153 and screwing and integrating the fastening bolt 61 to the insertion screw hole 155*a* of the head portion 155, the protrusion part 152 and the fit recess member 153 can be manufactured separately, and productivity can be improved.

Seventh Embodiment

Figure 12:
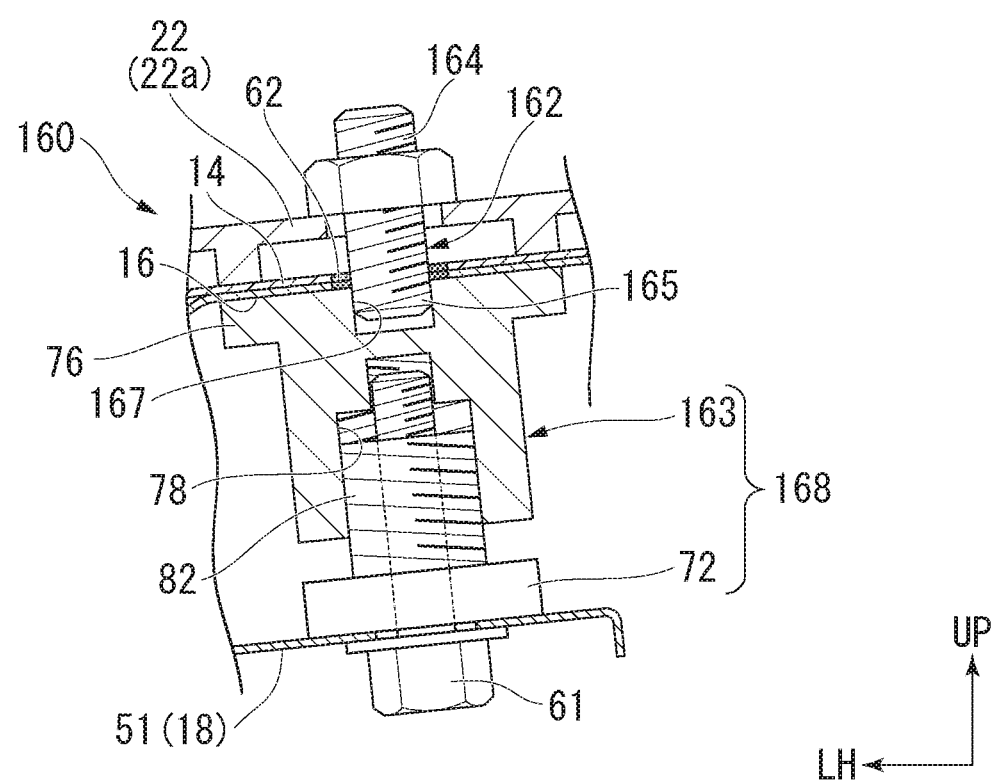
FIG. 12 is a cross-sectional view showing an article fixation apparatus according to a seventh embodiment.

As shown in FIG. 12, the roof rail attachment member 160 is obtained by replacing the protrusion part 67 and the fit recess member 71 of the first embodiment with a protrusion part 162 and a fit recess member (one member) 163, and other configurations are the same as those of the roof rail attachment member 60 of the first embodiment.

The protrusion part 162 is constituted of a screw part having a first male screw 164 and a second male screw 165. The first male screw 164 fixes the roof rail 22 by being screwed to the roof rail 22. The second male screw 165 is formed on a side opposite to the first male screw 164.

The fit recess member 163 is formed such that a top screw hole 167 can be screwed to the second male screw 165 along the axis line at the center of the protrusion top part 76 of the first embodiment.

The second male screw 165 of the protrusion part 162 is screwed to the top screw hole 167 of the protrusion top part 76. Thereby, the protrusion part 162 is provided integrally with the protrusion top part 76. In this state, the first male screw 164 protrudes from the roof panel 14 to the vehicle outside. Thereby, the protrusion part 162 is provided integrally with the fit recess member 163. Further, the roof rail 22 is attached to the first male screw 164 that protrudes from the roof panel 14.

According to the roof rail attachment member 160, the protrusion part 162 is provided integrally with the fit recess member 163, and the protrusion shape part 82 of the fit protrusion member 72 is screwed to the female screw 78 of the fit recess member 163.

Accordingly, it is possible to integrate the protrusion part 162, the fit recess member 163, and the fit protrusion member 72. Thereby, the load input from the roof rail 22 can be appropriately transmitted to the fit recess member 163 and the fit protrusion member 72 (that is, the adjustment mechanism 168) via the protrusion part 162.

Further, by screwing and integrating the second male screw 165 of the protrusion part 162 to the top screw hole 167 of the fit recess member 163, it is possible to easily assemble the fit recess member 163. Further, the protrusion part 162 and the fit recess member 163 can be manufactured separately, and productivity can be improved.

Eighth Embodiment

Figure 13:
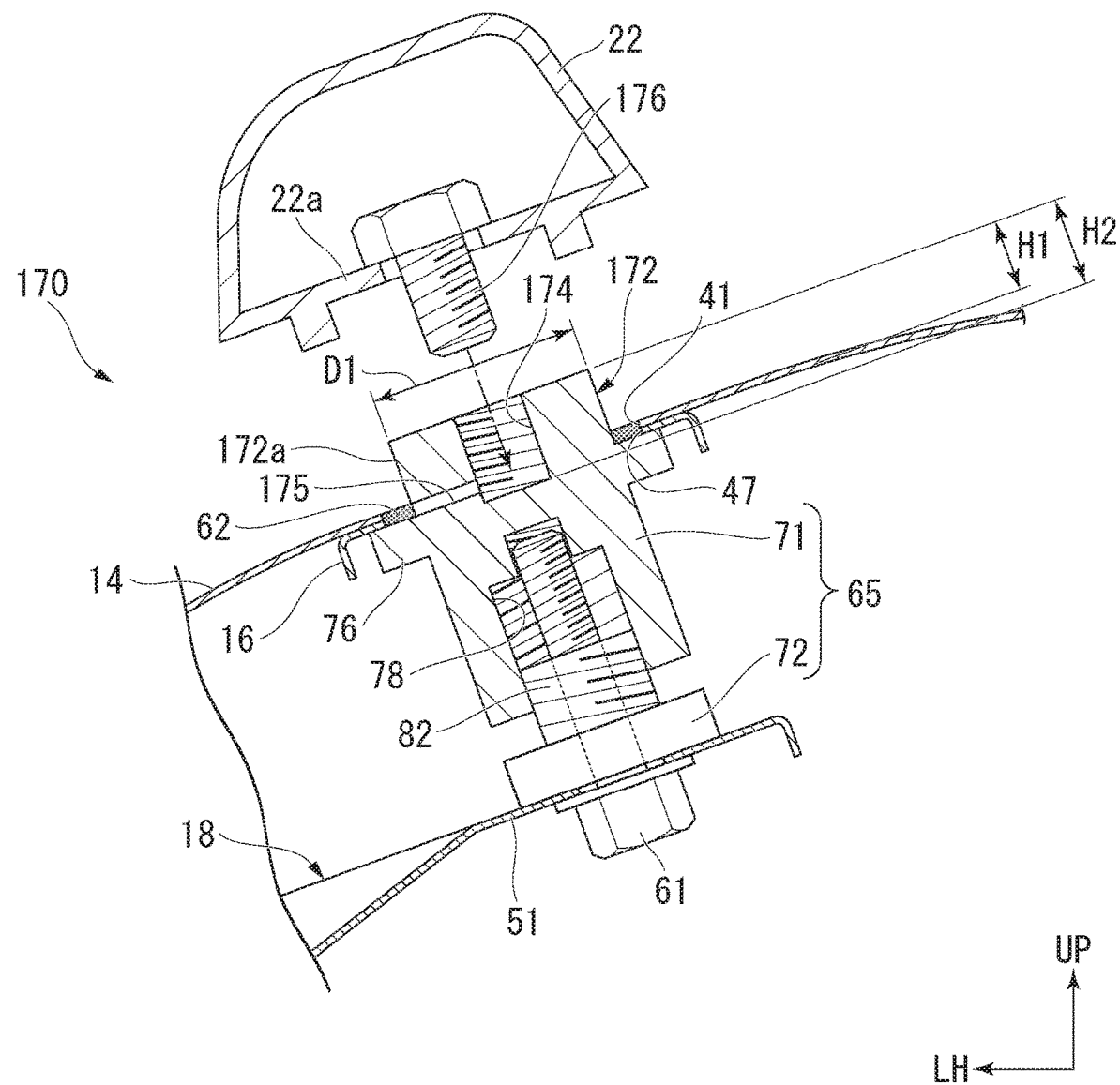
FIG. 13 is a cross-sectional view showing an article fixation apparatus according to an eighth embodiment.
Figure 14:
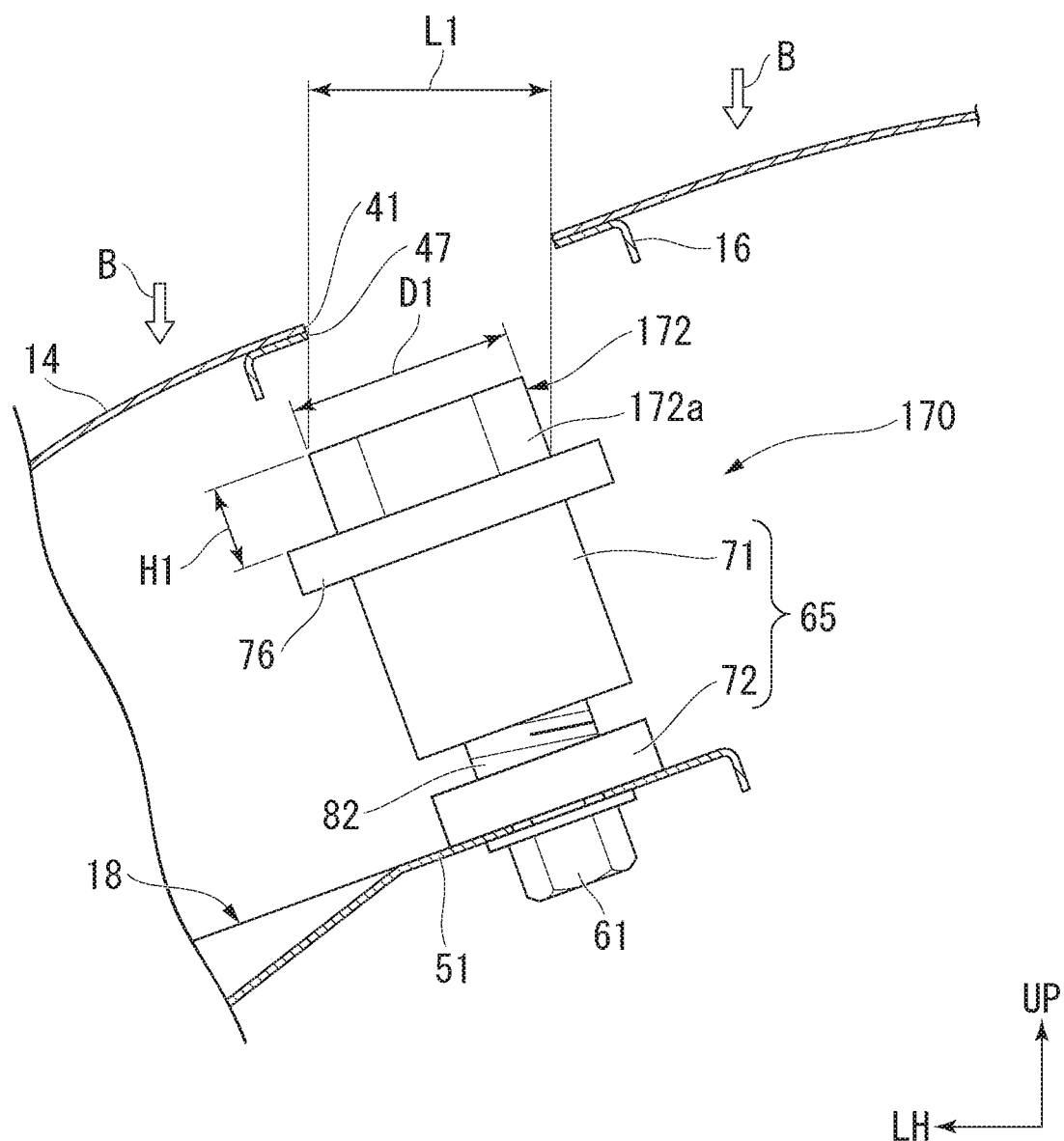
FIG. 14 is a side view showing an example in which a roof panel is attached to the article fixation apparatus according to the eighth embodiment.

As shown in FIG. 13 and FIG. 14, the roof rail attachment member 170 is obtained by replacing the protrusion part 67 of the first embodiment with a protrusion part 172, and other configurations are the same as those of the roof rail attachment member 60 of the first embodiment.

The protrusion part 172 is constituted of a nut part and is integrally formed to protrude from the protrusion top part 76 of the fit recess member 71. The protrusion part 172 has a nut screw hole 174 and a discharge hole 175. The discharge hole 175 penetrates from the nut screw hole 174 to an outer circumferential surface 172a of the protrusion part 172. The nut screw hole 174 is formed to be capable of being screwed to an attachment bolt (male screw) 176 of the roof rail 22. By the attachment bolt 176 of the roof rail 22 being screwed to the nut screw hole 174 of the protrusion part 172, the roof rail 22 is attached to the adjustment mechanism 65 and fixed to the roof panel 14.

Further, the protrusion shape part 82 of the fit protrusion member 72 is screwed to the female screw 78 of the fit recess member 71.

Thereby, the protrusion part 172, the fit recess member 71, and the fit protrusion member 72 are integrated.

According to the roof rail attachment member 170, the protrusion part 172 is provided integrally with the fit recess member 71 of the adjustment mechanism 65, and the fit recess member 71 is screwed to the fit protrusion member 72 of the adjustment mechanism 65. Accordingly, it is possible to integrate the protrusion part 172, the fit recess member 71, and the fit protrusion member 72. Thereby, the load input from the roof rail 22 can be appropriately transmitted to the adjustment mechanism 65 via the protrusion part 172.

Further, by the protrusion part 172 being constituted of the nut portion and by providing the protrusion part 172 integrally with the fit recess member 71, the nut screw hole 174 can be formed in the axial direction up to the fit recess member 71. Accordingly, a depth dimension H2 of the nut screw hole 174 can be sufficiently secured in a state where a height dimension H1 of the protrusion part 172 is controlled to be smaller than the depth dimension H2 of the nut screw hole 174. Further, an outer diameter dimension (outer circumference dimension) D1 of the protrusion part 172 can be increased compared to a case where the protrusion part 172 is formed of a male screw part. Thereby, the load input from the roof rail 22 can be further appropriately transmitted to the adjustment mechanism 65 via the protrusion part 172.

For example, when the roof panel 14 is attached to the roof rail attachment member 170, the roof panel 14 is lowered in an arrow B direction, and the first penetration hole 41 of the roof panel 14 and the second penetration hole 47 of the reinforcement member 16 are fitted into the protrusion part 172.

The roof rail attachment member 170 is arranged to be sloped with respect to a descending direction of the roof panel 14. Therefore, in order to fit the first penetration hole 41 and the second penetration hole 47 in the protrusion part 172, it is necessary to ensure each of the penetration holes 41 and 47 larger than a slope dimension L1 of the protrusion part 172. Further, in consideration of a seal performance between the protrusion part 172 and the penetration holes 41 and 47, the penetration holes 41 and 47 are preferably formed along the outer circumferential surface 172a of the protrusion part 172.

Therefore, the protrusion part 172 is constituted of a nut part, and the height dimension H1 of the protrusion part 172 is controlled to be small. Accordingly, the slope dimension L1 of the protrusion part 172 can be kept small. Thereby, it is possible to form the first penetration hole 41 and the second penetration hole 47, for example, in a shape closer to a circular shape along the outer circumferential surface 172a of the protrusion part 172. Accordingly, it is possible to satisfactorily ensure seal applicability to the gap between the protrusion part 172 and each of the penetration holes 41 and 47.

Further, by forming the first penetration hole 41 and the second penetration hole 47 along the outer circumferential surface 172a of the protrusion part 172, it becomes possible to perform accurate positioning of each of the penetration holes 41 and 47 with respect to the protrusion part 172, and it is possible to satisfactorily ensure the setting property of the roof panel 14.

Further, the discharge hole 175 penetrates from the nut screw hole 174 to the outer circumferential surface 172a of the protrusion part 172. Thereby, when the vehicle body Ve to which the roof panel 14 is fixed is, for example, immersed in a rust prevention coating liquid and is electrodeposited, excess coating liquid can be discharged from the nut screw hole 174 to the outside of the protrusion part 172 through the discharge hole 175 such that excess coating liquid does not remain in the nut screw hole 174.

The first seal material 62 that closes the gap 87 between the first and second penetration holes 41 and 47 and the protrusion parts 67, 142, 152, 162, and 172 of the first to eighth embodiments is easy to be processed and inexpensive, for example, because the first seal material 62 is a thermosetting seal member such as a sealing material or a caulking material. Further, there is no concern of deterioration of the seal performance of the first seal material 62 due to aging deterioration of the rubber compared to a rubber seal member in a conventional roof rail fixation structure (a structure in which rubber is crushed at a constant rate and is sealed).

Therefore, it is possible to satisfactorily maintain the seal performance that closes the gap 87 between the first and second penetration holes 41 and 47 and the protrusion part 67, 142, 152, 162, and 172 over many years.

Further, since a load transmission path of the roof rail fixation structure (article fixation apparatus 20) can be constituted only of metal components, there is no concern of embrittlement due to aging degradation, and it is possible to satisfactorily maintain the load transmission to the vehicle body Ve over many years.

The configuration elements in the embodiments described above can be appropriately replaced by known configuration elements without departing from the scope of the present invention, and the modified examples described above may be appropriately combined together.

For example, the first to eighth embodiments are described using an example in which, as the lower surface side of the roof panel 14, the raised part 16c is joined to the lower surface 14c of the roof panel 14, and the head part seat surface of the article fixation apparatus is joined to the lower surface 16d of the raised part 16c; however, the present invention is not limited thereto. As another example, for example, the head part seat surface of the article fixation apparatus can be directly joined to the lower surface 14c of the roof panel 14.

What is claimed is:

1. An article fixation apparatus that is configured to fix an article to a roof panel, the apparatus comprising:
    an article attachment member that includes a protrusion part which protrudes toward a vehicle outside via a penetration hole of the roof panel from a vehicle inside of the roof panel and which fixes the article and a head part seat surface of the protrusion part that is joined to a lower surface side of the roof panel; and
    a first seal material that prevents water permeation to the vehicle inside of the roof panel from a gap between the penetration hole and the protrusion part, wherein the article is fixed to the roof panel by the article being attached to the protrusion part of the article fixation member,
    the lower surface side of the roof panel includes a lower surface of the roof panel and a lower surface of a reinforcement member that is joined to the lower surface of the roof panel,
    the reinforcement member is joined to a region of the lower surface of the roof panel, the region being arranged around the penetration hole and being covered by the article from a vehicle body upward direction, and
    a second seal material that is provided between the reinforcement member and the lower surface of the roof panel throughout an entire circumference of the penetration hole.

2. The article fixation apparatus according to claim 1, wherein the head part seat surface of the protrusion part is joined throughout to an entire circumference of the penetration hole at the lower surface side of the roof panel.

3. The article fixation apparatus according to claim 2, wherein the article attachment member comprises an adjustment mechanism, and
    the adjustment mechanism comprises
        one member on which the protrusion part and the head part seat surface are integrally provided and
        another member that is capable of being screwed to the one member and that is fixed to a support member on a vehicle body side.

4. The article fixation apparatus according to claim 3, further comprising
    a fastening bolt which is configured to fasten the support member to the another member,
    wherein the support member has an attachment hole through which the fastening bolt that is fastened to the other member is capable of penetrating and which allows a position adjustment in a direction that intersects an axial direction of the fastening bolt.

5. The article fixation apparatus according to claim 3, wherein a base end part of the support member is supported by an attachment part on the vehicle body side, and
    the support member has a brace that is provided on the base end part and that extends at least in a vehicle width inward direction.

6. An article fixation structure assembly method for assembling the article fixation apparatus according to claim 3, the method comprising:
    a first step in which, in a state where the protrusion part protrudes from the reinforcement member that is joined to a lower surface of the roof panel, the head part seat surface together with the adjustment mechanism is fixed to a lower surface of the reinforcement member;
    a second step in which, in a state where the protrusion part protrudes from the roof panel, the reinforcement member is fixed to the roof panel; and
    a third step in which the adjustment mechanism is fixed to the support member.

* * * * *